(12) United States Patent
Cho et al.

(10) Patent No.: US 7,812,909 B2
(45) Date of Patent: Oct. 12, 2010

(54) LIQUID CRYSTAL DISPLAY

(75) Inventors: Seon-Ah Cho, Busan (KR); Ji-Won Sohn, Seoul (KR); Jun-Hee Na, Asan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 12/043,683

(22) Filed: Mar. 6, 2008

(65) Prior Publication Data
US 2008/0259263 A1 Oct. 23, 2008

(30) Foreign Application Priority Data
Apr. 20, 2007 (KR) ............... 10-2007-0038769
Apr. 30, 2007 (KR) ............... 10-2007-0041900

(51) Int. Cl.
*G02F 1/1343* (2006.01)

(52) U.S. Cl. ............... 349/142; 349/139; 349/141; 349/146

(58) Field of Classification Search ............... 349/141, 349/139, 138, 142, 143, 146, 158, 193
See application file for complete search history.

(56) References Cited

U.S. PATENT DOCUMENTS 5,594,564 A * 1/1997 Ishimoto et al. ............ 349/143
7,319,502 B2 * 1/2008 Chen et al. ............ 349/141
2005/0105033 A1 * 5/2005 Itou et al. ............ 349/141
2006/0146243 A1 * 7/2006 Nakanishi et al. ............ 349/139
2008/0259263 A1 * 10/2008 Cho et al. ............ 349/142

FOREIGN PATENT DOCUMENTS

| JP | 2004037850 | 2/2004 |
| JP | 2006189610 | 7/2006 |
| KR | 1020060099635 | 9/2006 |

* cited by examiner

*Primary Examiner*—Brian M Healy
(74) *Attorney, Agent, or Firm*—H.C. Park & Associates, PLC

(57) ABSTRACT

A liquid crystal display includes a first insulating substrate, a pixel electrode disposed on the first insulating substrate, a second insulating substrate facing the first insulating substrate, a common electrode disposed on the second insulating substrate without patterning, and a liquid crystal layer interposed between the first and second insulating substrates. The pixel electrode is divided into a plurality of domains that include a plurality of microelectrodes arranged substantially parallel to each other and are connected through a connecting pattern. The connecting pattern is formed by connecting the end of microelectrodes of each domain to the side of microelectrodes of adjacent domains.

30 Claims, 16 Drawing Sheets

S'

S

LIQUID CRYSTAL DISPLAY

CROSS REFERENCE TO RELATED APPLICATIONS

This application claims priority from and the benefit of Korean Patent Application No. 10-2007-0038769, filed on Apr. 20, 2007, and Korean Patent Application No. 10-2007-0041900, filed on Apr. 30, 2007, which are hereby incorporated by reference for all purposes as if fully set forth herein.

BACKGROUND OF THE INVENTION

1. Field of the Invention

The present invention relates to a liquid crystal display and particularly, to a liquid crystal display that may have improved light transmittance or response speed.

2. Discussion of the Background

A liquid crystal display, which is one type of flat panel display that is widely used, includes two substrates with electric field generating electrodes, such as a pixel electrode and a common electrode, and a liquid crystal layer inserted between the substrates. An electric field is generated in the liquid crystal layer by applying voltages to the electric field generating electrodes to determine the alignment of the liquid crystals in the liquid crystal layer and display images by controlling polarization of incident light.

Among liquid crystal displays, a vertical alignment mode liquid crystal display, in which the major axis of the liquid crystals is arranged perpendicular to the upper and lower substrates in the absence of an electric field, has been highlighted because it can provide a high contrast ratio and a wide viewing angle. A gap may be formed in the electric field generating electrode and/or a protrusion may be formed on the electric field generating electrode to achieve a wide viewing angle in the vertical alignment mode liquid crystal display.

Liquid crystal display including gaps include Patterned Vertical Alignment (PVA) mode liquid crystal displays, in which gaps are formed in both the upper and lower substrates, and Patternless VA mode liquid crystal displays, in which micropatterns are formed only on the lower substrate. Further, the Patternless VA mode liquid crystal displays may be advantageous because they prevent static electricity without causing misalignment.

However, even in the Patternless VA mode liquid crystal display, the light transmittance may be reduced due to textures generated where microelectrodes cross each other. Also, the response speed may be decreased due to random motions and immediate residual images may be caused by disclination.

Therefore, a liquid crystal display having improved response speed and light transmittance is desirable.

SUMMARY OF THE INVENTION

The present invention provides a liquid crystal display that may have improved light transmittance.

The present invention also provides a liquid crystal display that may have improved response speed.

Additional features of the invention will be set forth in the description which follows, and in part will be apparent from the description, or may be learned by practice of the invention.

The present invention discloses a liquid crystal display including a first insulating substrate, a pixel electrode disposed on the first insulating substrate and including a plurality of domains, a second insulating substrate facing the first insulating substrate, a common electrode disposed on the second insulating substrate without being patterned, and a liquid crystal layer interposed between the first and second insulating substrates. The pixel electrode includes a plurality of microelectrodes arranged substantially parallel to each other in each domain and a connecting pattern that connects the microelectrodes. The connecting pattern is formed by connecting the end of microelectrodes of each domain to the side of microelectrodes of adjacent domains.

The present invention also discloses a liquid crystal display including a first insulating substrate, a pixel electrode disposed on the first insulating substrate, a second insulating substrate facing the first insulating substrate, a common electrode disposed on the second insulating substrate without being patterned; and a liquid crystal layer interposed between the first and second insulating substrates. The first insulating substrate includes first and second connecting patterns arranged substantially parallel to each other in a first direction and a plurality of first and second microelectrodes arranged substantially parallel to each other and connected to the first and second connecting patterns, respectively. The first and second microelectrodes are arranged substantially parallel to each other in a second direction and alternately disposed.

The present invention also discloses a liquid crystal display including a first insulating substrate, a pixel electrode disposed on the first insulating substrate and comprising a plurality of domains, a second insulating substrate facing the first insulating substrate, a common electrode disposed on the second insulating substrate without being patterned, and a liquid crystal layer interposed between the first insulating substrate and the second insulating substrate. The pixel electrode comprises a plurality of microelectrodes arranged substantially parallel to each other in each domain and a connecting pattern that connects the microelectrodes. The connecting pattern is formed by connecting the end of microelectrodes of each domain to the side of microelectrodes of adjacent domains. Each microelectrode is provided with a notch. Each microelectrode group is divided into two or more domains by the notch.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
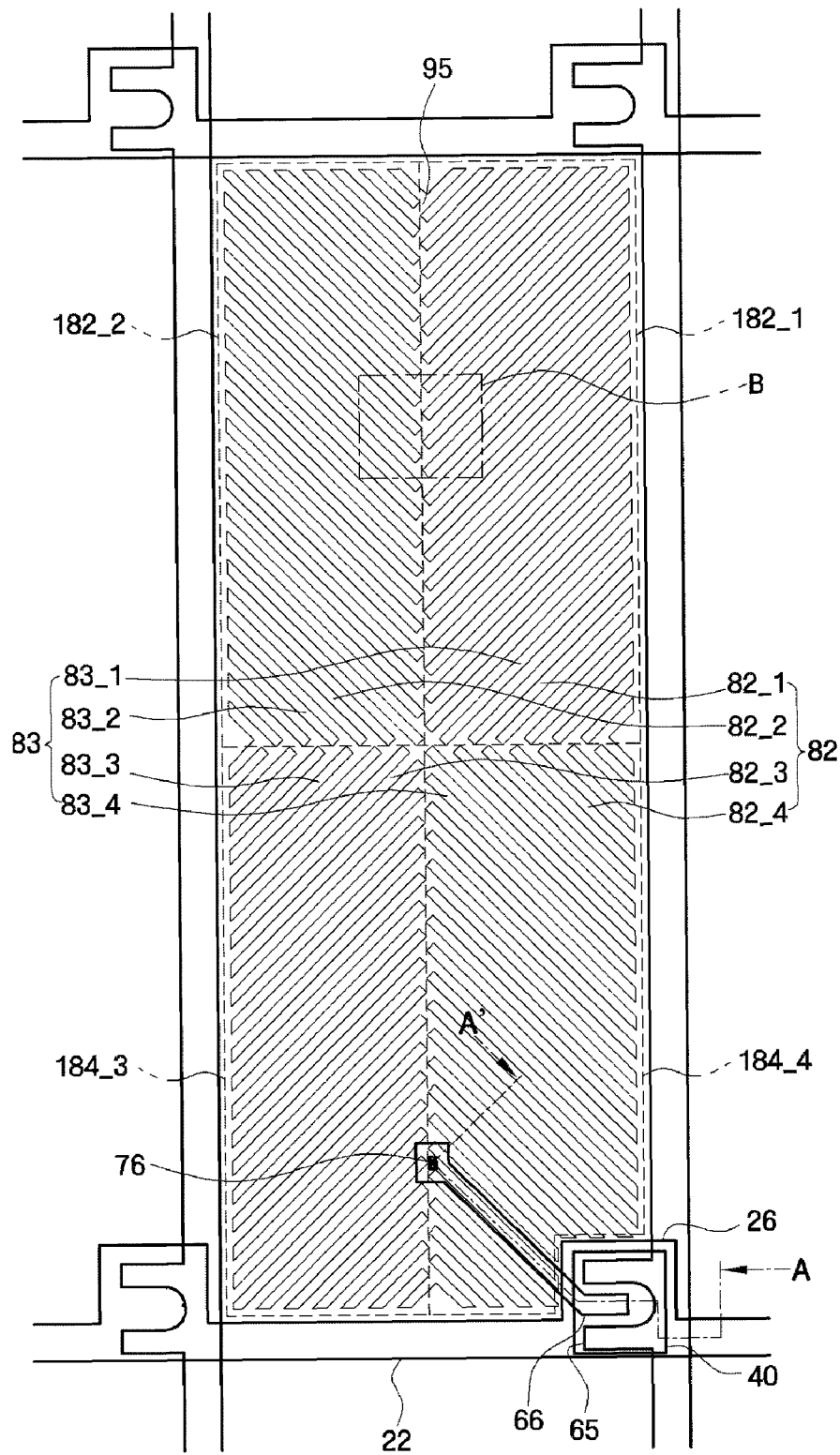
FIG. 1 is a layout of a thin film transistor display panel included in a liquid crystal display according to a first exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the sizes and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 2:
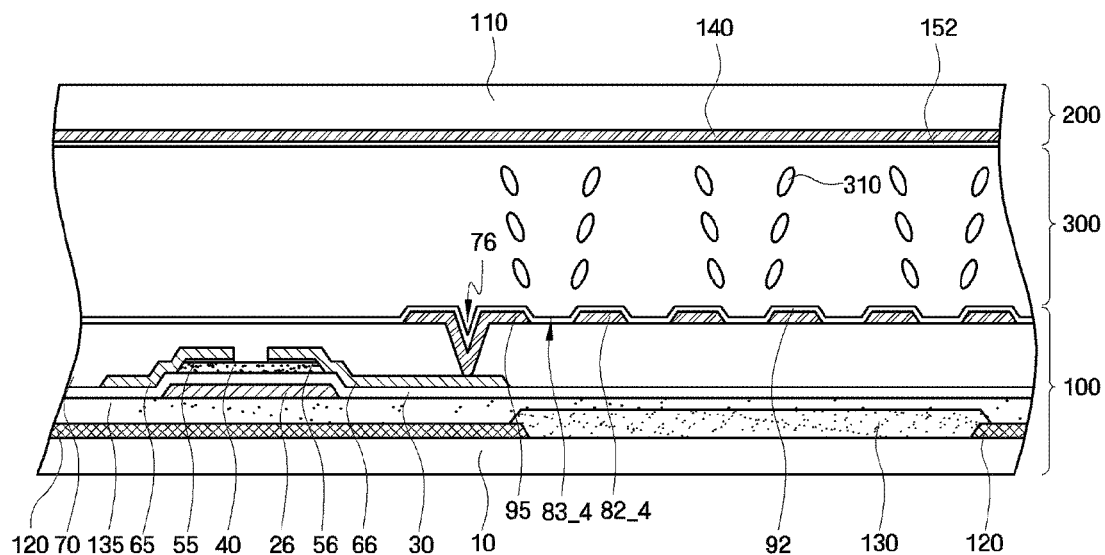
FIG. 2 is a cross-sectional view taken along line A-A' of FIG. 1.
Figure 3:
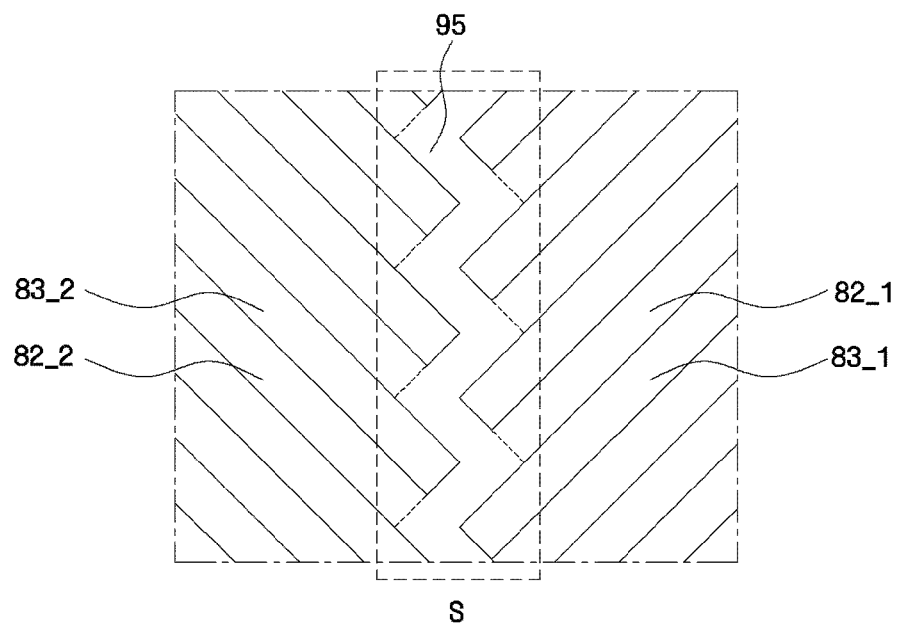
FIG. 3 is an enlarged view of portion B in FIG. 1.
Figure 4A:
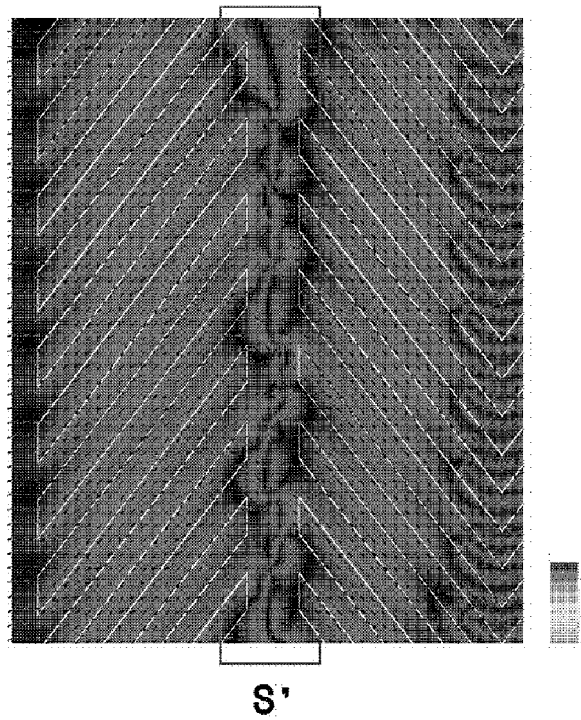
FIG. 4A and FIG. 4B are photographs comparing textures generated in the liquid crystal display according to the first exemplary embodiment of the invention with a comparative example.
Figure 4B:
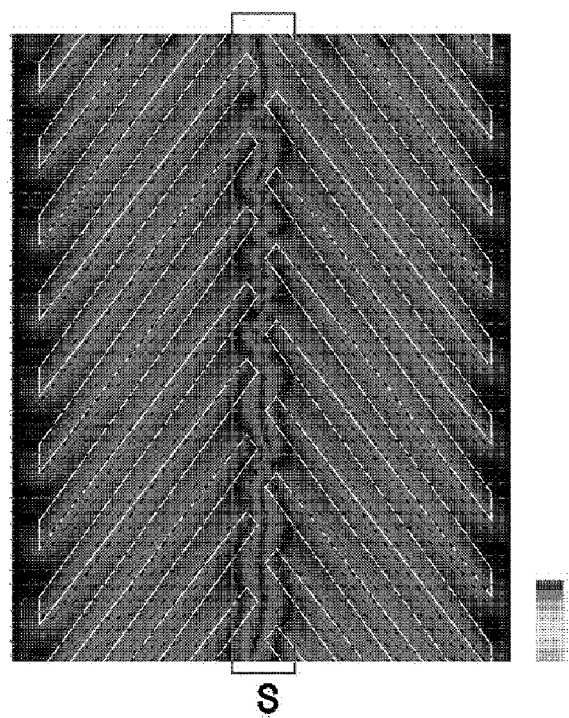

A liquid crystal display according to a first exemplary embodiment of the invention is described hereafter with reference to FIG. 1, FIG. 2, FIG. 3. FIG. 4A, and FIG. 4B. FIG. 1 is a layout of a thin film transistor display panel included in a liquid crystal display according to a first exemplary embodiment of the invention. FIG. 2 is a cross-sectional view taken along line A-A' of FIG. 1.

A liquid crystal display of this exemplary embodiment includes a thin film transistor display panel 100 and a common electrode display panel 200 facing each other and a liquid crystal layer 300 interposed between the display panels 100, 200.

Referring to FIG. 1 and FIG. 2, the thin film transistor display panel 100 included in the liquid crystal display of this exemplary embodiment includes a plurality of pixel electrodes 82 formed on a first insulating substrate 10 and connected to each other through a connecting pattern 95. Each pixel electrode 82 is divided into a plurality of domains 182_1, 182_2, 182_3, 182_4 and includes a plurality of microelectrodes 82_1, 82_2, 82_3, 82_4 arranged substantially parallel to each other in a predetermined direction within each domain 182_1, 182_2, 182_3, 182_4.

The color filters 130 and the pixel electrodes 82 may be formed in the thin film transistor display panel 100 included in the liquid crystal display of this exemplary embodiment. The liquid crystal display of this exemplary embodiment may have an Array On Color filter (AOC) structure in which a thin film transistor array, such as gate wire, is formed on the color filter 130 or a Color filter On Array (COA) structure in which the color filter 130 is formed on a thin film transistor array. A liquid crystal display of AOC structure is described by way of example.

When the liquid crystal display 100 has an AOC structure, black matrixes 120 that define pixel regions may be formed directly on the first insulating substrate 10. The black matrix 120 may be made of, for example, an opaque material, such as Cr, which may improve the picture quality by blocking light leakage. The matrix 120 may overlap the gate wire and/or data wire to maximize the aperture ratio.

Color filters 130 of red, green, and blue are sequentially arranged in a pixel region defined by the black matrix 120. The color filters 130 transmit light within a specific wavelength range only.

Each color filter 130 may include a photosensitive organic material, for example, photoresist. Further, the color filters 130 may be formed to have the same thicknesses or different thicknesses, for example, as a series of steps.

An overcoat layer 135 is formed on the color filters 130 to make them level with each other.

Gate lines 22 may be transversely formed on the overcoat layer 135 and gate electrodes 26 may protrude from the gate lines 22. The gate lines 22 and the gate electrodes 26 form a gate wire.

Further, storage wires 28 are formed transversely on the first insulating substrate 10 substantially parallel with the gate lines 22. The storage wire 28 overlaps a portion of the pixel electrodes 82 (described later) within pixels. According to the exemplary embodiment shown in FIG. 1, the storage wire 28 is arranged at the center of the pixel.; However, the invention is not limited thereto and the storage wire 28 may be any of various shapes and in any of various positions, as long as it forms a predetermined storage capacitance by overlapping the pixel electrodes 82.

The gate wire 22, 26 and the storage wire 28 may include an aluminum-based metal of aluminum(Al) and an aluminum alloy, a silver-based metal of silver(Ag) and a silver alloy, a copper-based metal of copper(Cu) and a copper alloy, a molybdenum-based metal of molybdenum(Mo) and a molybdenum alloy, chromium(Cr), titanium(Ti), or tantalum(Ta). Further, the gate wire 22, 26 and the storage wire 28 may have a multilayered structure including two electrically conductive films (not shown) having different physical properties. One of the electrically conductive films may include a low-resistance metal, such as an aluminum-based metal, a silver-based metal, or a copper-based metal, to reduce signal delay or voltage drop in the gate wire 22, 26 and the storage wire 28.

The other electrically conductive film may be formed of a material having good contact characteristics with Indium Tin Oxide (ITO) and Indium Zinc Oxide (IZO), such as a molybdenum-based metal, chromium, titanium, or tantalum. For example, a chromium lower film and an aluminum upper film or an aluminum lower film and a molybdenum upper film exemplify the above combinations. The invention, however, is not limited thereto and the gate wire 22, 26 and the storage wire 28 may include a variety of metals or conductors.

A gate insulating film 30 of silicon nitride (SiNx) or silicon oxide, etc. is formed on the gate wires 22, 26 and storage wire 28.

Semiconductor layers 40 of hydrogenated amorphous silicon or polycrystalline silicon etc. are formed on the gate insulating film 30. The semiconductor layer 40 may be formed in a variety of shapes, such as an island shape or a stripe shape, for example, as shown in FIG. 1, the semiconductor layer 40 may have an island shape corresponding to the gate electrodes 26. Further, when the semiconductor layer 40 is stripe shaped, it may extend to above the gate electrode 26 under the data line 62.

Ohmic contact layers 55, 56 of n+ hydrogenated amorphous silicon doped with n-type dopant or silicide in high concentration are formed on the semiconductor layer 40. The ohmic contact layers 55, 56 may be formed in a variety of shapes, such as island shapes or stripe shapes. For example, when the ohmic contact layers 55, 56 are island shaped, as shown in FIG. 2, they may be disposed under the source electrode 65 and drain electrode 66, respectively. Further, when the ohmic contact layers are stripe shaped, they may extend under the data line 62.

The data lines 62 and drain electrodes 66 are formed on the ohmic contact layers 55, 56 and the gate insulating film 30. The data lines 62 extend in a second direction, for example, longitudinally, and define pixels by crossing the gate lines 22. Source electrodes 65 branch from the data lines 62 and extend above the semiconductor layer 40. The drain electrode 66 is on the semiconductor layer 40 and spaced apart from the source electrode 65 with the gate electrode 26 therebetween. The drain electrode 66 includes a bar pattern on the semiconductor layer 40 and an expanding pattern extending from the bar pattern with a wider area exposed by a contact hole 76.

The data line 62, source electrode 65, and drain electrode 66 form a data wire.

The data wire 62, 65, 66 may include a refractory metal, such as chromium, a molybdenum-based metal, tantalum, or titanium, and may have a multilayered structure of a refractory metal lower film (not shown) and a low-resistance upper film (not shown) on the lower film. In addition to the chromium lower film and the aluminum upper film and the aluminum lower film and the molybdenum upper film described above, the multilayered structure may be, for example, a triple film of molybdenum film-aluminum film-molybdenum film.

At least a part of the source electrode 65 overlaps the semiconductor layer 40 and at least a part of the drain electrode 66 overlaps the semiconductor 40 and faces the source electrode 65 with the gate electrode 26 therebetween. The ohmic contact layers 55, 56 reduce the contact resistance between the semiconductor layer 40 and source electrode 65 and between the semiconductor layer 40 and drain electrode 66.

A protective film 70, which may be an insulating film, is formed on the data line 62, the source electrode 65, the drain electrodes 66, and the exposed portions of the semiconductor layer 40. The protective film 70 may include an inorganic material such as silicon nitride or silicon oxide, an organic material with photosensitivity and good planarization characteristics, or a low-dielectric constant insulating material such as a—Si:C:O or a—Si:O:F formed by plasma enhanced chemical vapor deposition. Further, the protective film 70 may have a bilayered-structure of a lower inorganic layer and an upper organic layer to protect the exposed portions of the semiconductor layer 40 while maintaining characteristics of the organic film.

The protective film 70 includes a contact hole 76 that exposes the drain electrode 66.

A pixel electrode 82 in each pixel is connected to the drain electrode 66 through the contact hole 76 in the protective film 70. Specifically, the pixel electrode 82 is connected to the drain electrode 66 through the contact hole 76 and receives a data voltage applied by the drain electrode 66. The pixel electrode 82 may include a transparent conductor such as ITO or IZO.

Characteristics of the pixel electrode of this exemplary embodiment are described in detail hereafter with reference to FIG. 1, FIG. 2, FIG. 3, FIG. 4A, and FIG. 4B. FIG. 3 is a partially enlarged view of portion B in FIG. 1.

Referring to FIG. 1, FIG. 2, and FIG. 3, the pixel electrode 82 is sectioned into a plurality of domains 182_1, 182_2, 182_3, 182_4 that are connected through the connecting patterns 95. The domains 182_1, 182_2, 182_3, 182_4 are each composed of a plurality of microelectrodes 82_1, 82_2, 82_3, 82_4 arranged substantially parallel to each other in predetermined directions and micro-slits 83 are disposed between the microelectrodes 82_1, 82_2, 82_3, 82_14. The microelectrodes 82_1, 82_2, 82_3, 82_14 and micro-slits 83_1, 83_2, 83_3, 83_4 are alternately arranged.

The pixel electrode 82 of this exemplary embodiment, for example, may be sectioned into four domains 182_1, 182_2, 182_3, 182_4 that divide the pixel electrode 82 into quarters. The microelectrodes 82_1, 82_2, 82_3, 82_4 may be long bars that extend in a predetermined direction in respective domain 182_1, 182_2, 182_3, 182_4. The microelectrodes 82_1, 82_2, 82_3, 82_4 and micro-slits 83_1, 83_2, 83_3, 83_4 between the microelectrodes 82_1, 82_2, 82_3, 82_4 are formed within the respective domain 182_1, 182_2, 182_3, 182_4. The microelectrodes 82_1, 82_2, 82_3, 82_4 and the micro-slits 83_1, 83_2, 83_3, 83_4 are alternately disposed and the widths of the microelectrodes 82_1, 82_2, 82_3, 82_4 and the micro-slits 83_1, 83_2, 83_3, 83_4 may be the same. The widths of the microelectrodes 82_1, 82_2, 82_3, 82_4 may be about 3 to 5 µm in consideration of high light transmittance and the exposure sensitivity of an exposing apparatus forming the microelectrodes 82_1, 82_2, 82_3, 82_4. All of the microelectrodes 82_1, 82_2, 82_3, 82_4 of this exemplary embodiment have a constant width from the center to the edges of the pixel electrode 82. The microelectrodes 82_1, 82_2, 82_3, 82_4 and the micro-slits 83_1, 83_2, 83_3, 83_4 are arranged parallel to each other in predetermined directions within the respective domain 182_1, 182_2, 182_3, 182_4, but the arrangement directions of the micro-slits 83_1, 83_2, 83_3, 83_4 are different for each domain 182_1, 1822, 1823, 182_4.

In detail, for example, the first domain 182_1 may be in the right-upper quarter of a quadrant for the pixel electrode 82. The first domain 182_1 includes a plurality of first microelectrodes 82_1 arranged parallel to each other in a first direction. The first direction is angled at about 45° with respect to the polarization axis of a polarizer (not shown) formed on the first insulating substrate 10. Micro-slits 83_1 are disposed between the first microelectrodes 82_1 formed in the first direction within the first domain 182_1. The first microelectrodes 82_1 and the first micro-slits 83_1 are alternately arranged and form an electric field with the common electrode 140. The liquid crystals 310 tilt in the direction of an electric field generated between the first microelectrodes 82_1 and the first micro-slits 83_1, and the common electrode 140 and consequently are aligned toward the center of the pixel electrode 82. That is, the alignment direction of the liquid crystals 310 in the first domain 182_1 is angled at about 45° with respect to the polarization axis of the polarizer (not shown) formed on the first insulating substrate 10.

The second domain 182_2, for example, may be the left-upper quarter of the quadrant for the pixel electrode 82. The second domain 182_2 includes a plurality of second microelectrodes 82_2 arranged parallel to each other in a second direction. The second direction may be substantially perpendicular to the first direction and angled at about 135° with respect to the polarization axis of the polarizer (not shown) formed on the first insulating substrate 10. Second micro-slits 83_2 are disposed between the second microelectrodes 82_2 formed in the second direction within the second domain 182_2. The liquid crystals 310 are arranged toward the center of the pixel electrode 82 by an electric field generated between the second microelectrodes 82_2, the second micro-slits 83_2, and the common electrode 140. That is, the alignment direction of the liquid crystals 310 in the second domain 182_2 may be angled at about 135° with respect to the polarization axis of the polarizer (not shown) formed on the first insulating substrate 10.

The first domain 182_1 and the second domain 182_2 are adjacent to each other and are connected by the connecting pattern 95 and the extensions of the first and second microelectrodes 82_1, 82_2. The connecting pattern 95 is formed by connecting the end of microelectrodes of each domain to the side of microelectrodes of adjacent domains. In detail, the connecting pattern 95 may be a zigzag pattern formed the extensions of the first microelectrodes 82_1 and the second microelectrodes 82_2, which are alternately arranged. That is, the microelectrodes 82_1 and the second microelectrodes 82_2 may cross each other. The connecting pattern 95 may have substantially the same width as the first and second microelectrodes 82_1, 82_2. The alignment directions of the liquid crystals 310 in the first domain 182_1 and the second domain 182_2 form a 90° angle and may produce textures in the adjacent areas of the first domain 182_1 and the second domain 182_2 due to collisions of the liquid crystals 3 10. As a result, the light transmittance of the liquid crystal display may be reduced, but the connecting pattern 95 of the liquid crystal display according to this exemplary embodiment may be very small in width, for example 3 to 5 μm, and may be the same as the width of the first and second microelectrodes 82_1, 82_2, so that the portions where textures are generated may be narrowed and the textures may be uniform.

Referring to FIG. 4A to FIG. 4B, textures generated in the liquid crystal display including the pixel electrodes of this exemplary embodiment are compared to those generated in a liquid crystal display including pixel electrodes of another configuration. FIG. 4A and FIG. 4B are photographs comparing textures generated in the liquid crystal display according to the first exemplary embodiment of the invention with those of a comparative example.

Referring to FIG. 4A, it can be seen that with the liquid crystal display including microelectrodes branching in four directions and a cross-shaped connecting patterns that section the pixel electrode into quarters, wide and non-uniform textures are formed in the region S' near the cross-shaped wide connecting pattern. In contrast, it can be seen that when the liquid crystal display of this exemplary embodiment does not include a cross-shaped connecting pattern, the region S where textures are generated is narrowed because the first and second domains are connected through a narrow connecting pattern and also that the textures are uniform. Therefore, the textures of a liquid crystal display according to this exemplary embodiment may be reduced without a need to block the portion where the textures are generated with other metallic electrodes and light transmittance may be improved.

Returning to FIG. 1, FIG. 2, and FIG. 3, the first display panel 100 may further include a third domain 182_3 and a fourth domain 182_4 under the pixel electrodes 82.

The third domain 182_3, for example, may be in the left-lower quarter of the quadrant for the pixel electrode 82. The third domain 182_3 includes a plurality of third microelectrodes 82_3 arranged parallel to each other in the third direction. The third direction may be substantially perpendicular to the second direction and angled at about 225° with respect to the polarization axis of the polarizer (not shown) formed on the first insulating substrate 10. Third micro-slits 83_3 are disposed between the third microelectrodes 82_3 formed in the third direction within the third domain 182_3. The alignment direction of the liquid crystals 310 in the third domain 182_3 may be angled at about 225° with respect to the polarization axis of the polarizer (not shown) formed on the first insulating substrate 10. The second domain 182_2 and the third domain 182_3 are connected through the connecting pattern 95 and the extensions of the second domain 182_2 and the third domain 182_3.

The fourth domain 182_4, for example, may be in the right-upper quarter of the quadrant for the pixel electrode 82. The fourth domain 182_4 includes a plurality of fourth microelectrodes 82_4 arranged parallel to each other in a fourth direction. The fourth direction may be substantially perpendicular to the third direction and the first direction and angled at about 315° with respect to the polarization axis of the polarizer (not shown) formed on the first insulating substrate 10. Fourth micro-slits 83_4 are disposed between the fourth microelectrodes 82_4 formed in the fourth direction within the fourth domain 182_4. The alignment direction of the liquid crystals 310 in the fourth domain 182_4 may be angled at about 315° with respect to the polarization axis of the polarizer (not shown) formed on the first insulating substrate 10. The third domain 182_3 and fourth domain 182_4 are connected through the connecting pattern 95, the extensions of the third microelectrodes 82_3 and fourth microelectrodes 82_4, and the fourth domain 182_4 and first domain 182_1 are connected through the connecting pattern 95 and the extensions of the fourth microelectrodes 82_4 and the first microelectrodes 82_1. Consequently, all four domains 182_1, 182_2, 182_3, 182_4 are connected through the connecting pattern 95 and narrow non-uniform textures are formed at the connecting portions of the domains 182_1, 182_2, 182_3, 182_4, which may improve light transmittance.

A first vertical alignment film 92 that aligns the liquid crystals 310 is formed on the pixel electrodes 82 and the protective film 70 of this exemplary embodiment. The first vertical alignment film 92, together with a second vertical alignment film 152, vertically align the liquid crystals 3 10. Therefore, when a driving voltage is not applied to the liquid crystal display, a clear black color appears on the liquid crystal display. The first vertical alignment film 92, for example, may be made of a material including a main chain of polyimide and a side chain.

A polarizer (not shown) may be formed on the first insulating substrate 10. In detail, the polarizer may be formed on the first insulating substrate 10 opposite the pixel electrodes 82. The polarization axis of the polarizer formed on the first insulating substrate 10 may be perpendicular to the polarization axis of the polarizer formed on the second insulating substrate (110 in FIG. 2).

Returning to FIG. 2, the common electrode display panel 200 includes the common electrode 140 that is formed on the second insulating substrate 110 without patterning and faces the thin film transistor display panel 100. The common electrode 140 of this exemplary embodiment is not patterned. Since a process for patterning the common electrode 140 is not required for the common electrode display panel 200 of this exemplary embodiment, it may be possible to prevent misalignment in the assemblage of the thin film transistor display panel 100 and the common electrode display panel 200 to achieve high transmittance because an anti-static process is not required, thereby saving manufacturing cost.

The second vertical alignment film 152 that vertically aligns the liquid crystals 310 is formed on the common electrode 140. A spacer maintaining a cell gap, which is the gap between the thin film transistor display panel 100 and common electrode display panel 200, may be interposed between the display panels.

A polarizer may be disposed on the side opposite the side with the common electrode 140 of the second insulating substrate 110, which is perpendicular to the polarization axis of the polarizer formed on the first insulating substrate 10.

A liquid crystal layer 300 including the liquid crystals 310, a UV-curable monomer, and a UV-curable initiator is interposed between the opposite thin film transistor display panel 100 and the common electrode display panel 200.

The liquid crystals 310 contained in the liquid crystal layer 300 may have negative dielectric anisotropy and may be nematic liquid crystals 310. The UV-curable monomer, for example, may be an acrylate monomer and the UV-curable initiator may include a material that can absorb UV light.

The liquid crystals 310 contained in the liquid crystal layer 300 described above are pre-tilted toward the connecting pattern 95, for example, at about 88° to 90° with respect to the thin film transistor display panel 100 by irradiating UV.

A backlight assembly with lamps is disposed under the thin film transistor display panel 100, the common electrode display panel 200, and the liquid crystal layer 300 interposed between the display panels.

Figure 5:
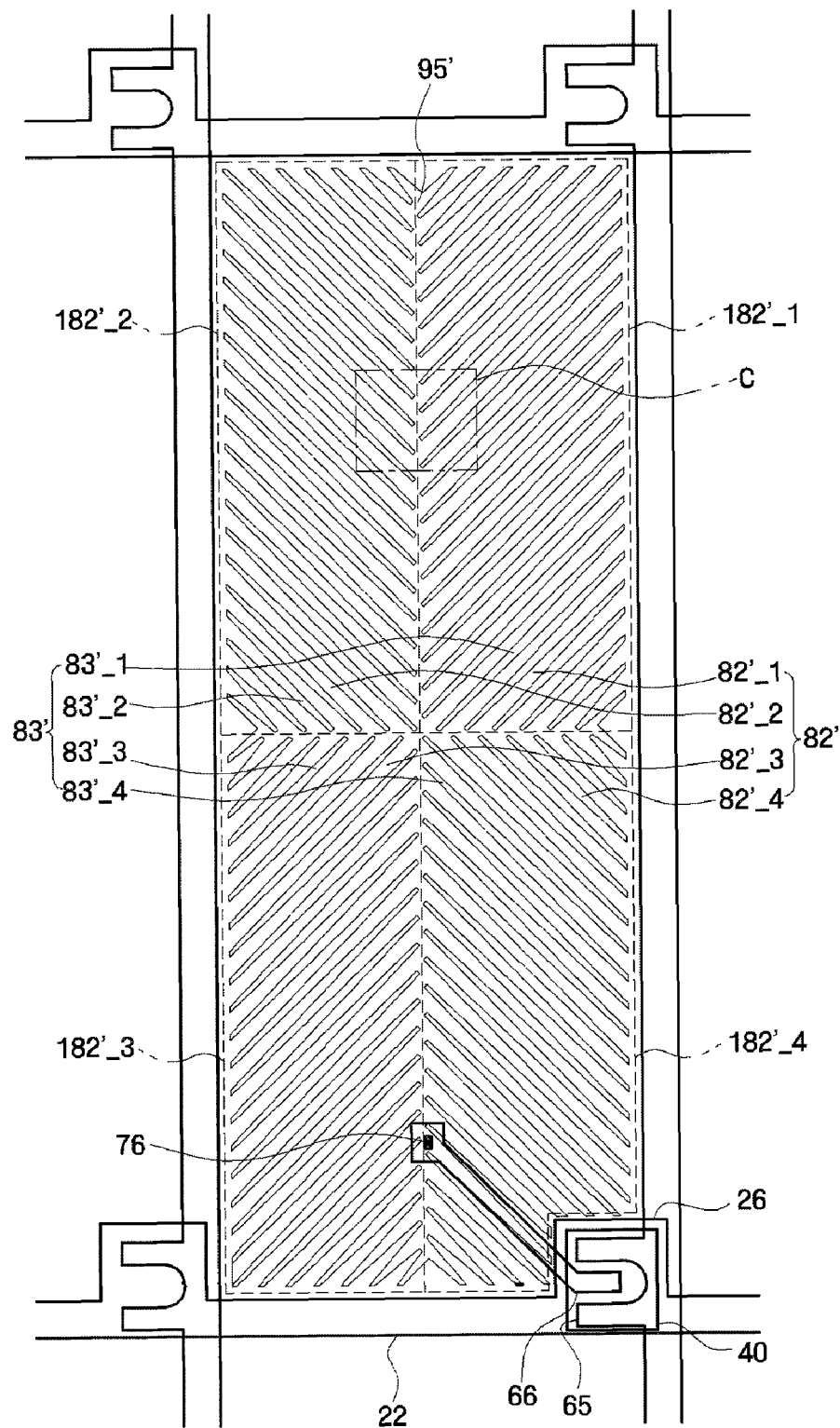
FIG. 5 is a layout of a thin film transistor display panel included in a liquid crystal display according to a modification of the first exemplary embodiment of the invention.
Figure 6:
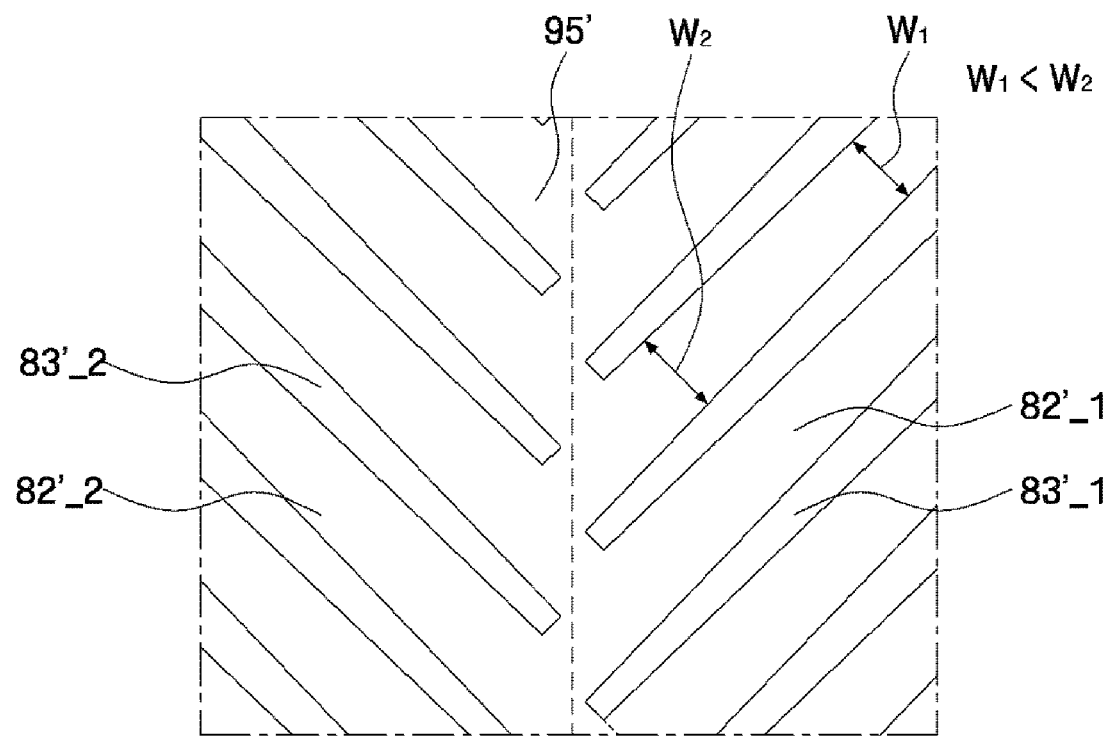
FIG. 6 is an enlarged view of portion C in FIG. 5.
Figure 7:
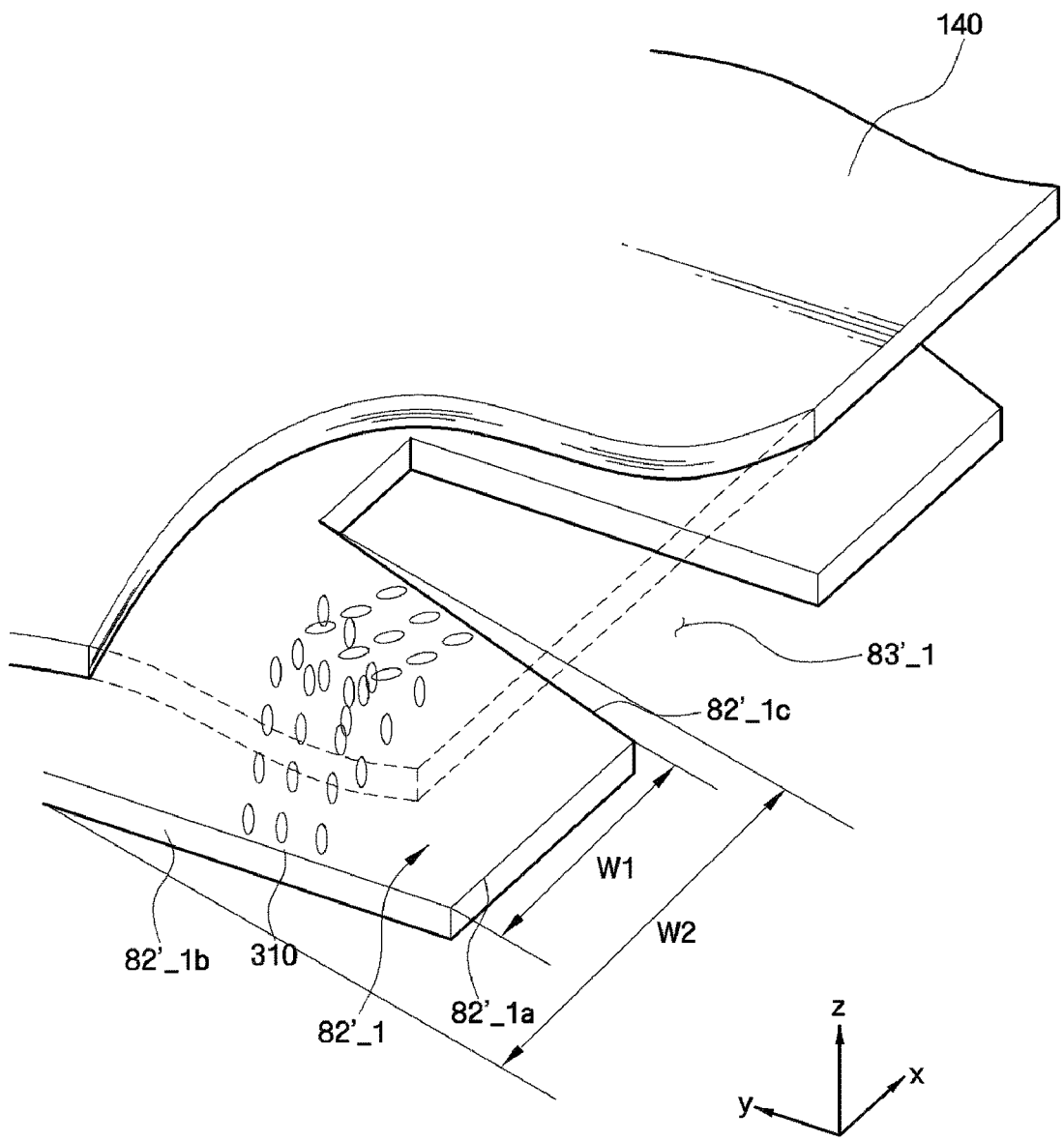
FIG. 7 is a perspective view of a liquid crystal display according to a modification of the first exemplary embodiment of the invention, including a part of portion C in FIG. 5.

With reference to FIG. 5, FIG. 6, and FIG. 7, a liquid crystal display according to a modification of the first exemplary embodiment is described hereafter in detail. FIG. 5 is a layout of a thin film transistor display panel included in a liquid crystal display according to a modification from the first exemplary embodiment of the invention. FIG. 6 is an enlarged view of portion C in FIG. 5. In the following exemplary embodiments and modifications, the components that are the same as those in the first exemplary embodiment of the invention are denoted by the same reference numerals and are not described for the sake of convenience.

According to a liquid crystal display of this modification, the microelectrodes 82'_1, 82'_2, 82'_3, and 82'_4 decrease in width in the direction away from a connecting pattern 95'. Accordingly, the micro-slits 83'_1, 83'_2, 83'_3, and 84'_4 increase in width in the direction away from the connecting pattern 95'.

The width $W_2$ of the microelectrodes 82'_1, 82'_2, 82'_3, 82'_4 near the connecting pattern 95' is larger than the width $W_1$ of the microelectrodes 82'_1, 82'_2, 82'_3, 82'_4 near the edges of the microelectrodes 82'_1, 82'_2, 82'_3, 82'_4 in this modification. Micro-slits 83'_1, 83'_2, 83'_3, 83'_4 are alternately arranged with the microelectrodes 82'_1, 82'_2, 82'_3, 82'_4 and the width increases toward the edges of the microelectrodes 82'_1, 82'_2, 82'_3, 82'_4. Accordingly, liquid crystals (310 in FIG. 7) may be easily aligned according to the connecting pattern 95' and the response speed may be improved.

The widths $W_1$, $W_2$ of the microelectrodes 82'_1, 82'_2, 82'_3, 82'_4 and the alignment direction of the liquid crystals 310 are described hereafter with reference to FIG. 7. FIG. 7 is a perspective view of a liquid crystal display according to a modification from the first exemplary embodiment of the invention, including a part of portion C in FIG. 5.

Considering the vertical electric field (Z-direction) generated between the common electrode 140 and the first microelectrode 82'_1 and the horizontal electric field (XY-direction) generated by the shape of the first microelectrode 82'_1, motions of the vertically aligned liquid crystals 310 are as follows. Liquid crystals 310 above the upper surface 82'_1a of the first microelectrode 82'_1 are inclined in the Y-direction, liquid crystals 310 above the first side 82'_1b of the first microelectrode 82'_1 are inclined in the XY-direction, and liquid crystals 310 above the second side 82'_1c of the first microelectrode 82'_1 are inclined in the -XY-direction. Because forces in the X-and -X-directions are offset, the liquid crystals 310 above the first microelectrode 82'_1 are generally inclined in the Y-direction, i.e. toward the connecting pattern 95'. Further, the liquid crystals 310 on the first micro-slit 83'_1 are also inclined in the Y-direction, i.e. toward the connecting pattern 95', in the alignment direction of the liquid crystals 310 on the first microelectrode 82'_1. Accordingly, since the first microelectrode 82'_1 decreases in width in the direction away from the connecting pattern 95 the force aligning the liquid crystals 310 toward the connecting pattern 95' increases. Therefore, the response speed of the liquid crystal display may increase.

Figure 8:
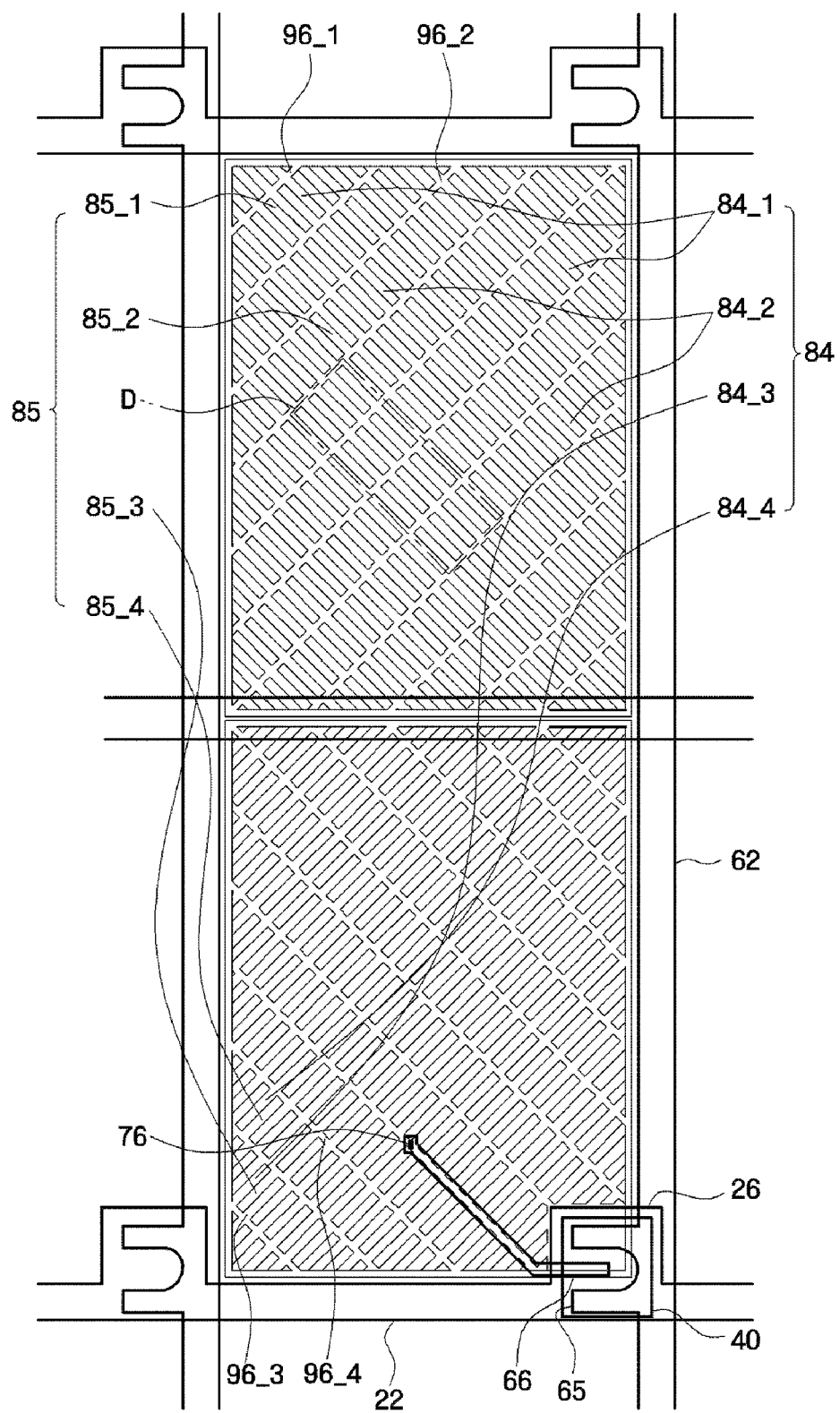
FIG. 8 is a layout of a thin film transistor display panel included in a liquid crystal display according to a second exemplary embodiment of the invention.
Figure 9:
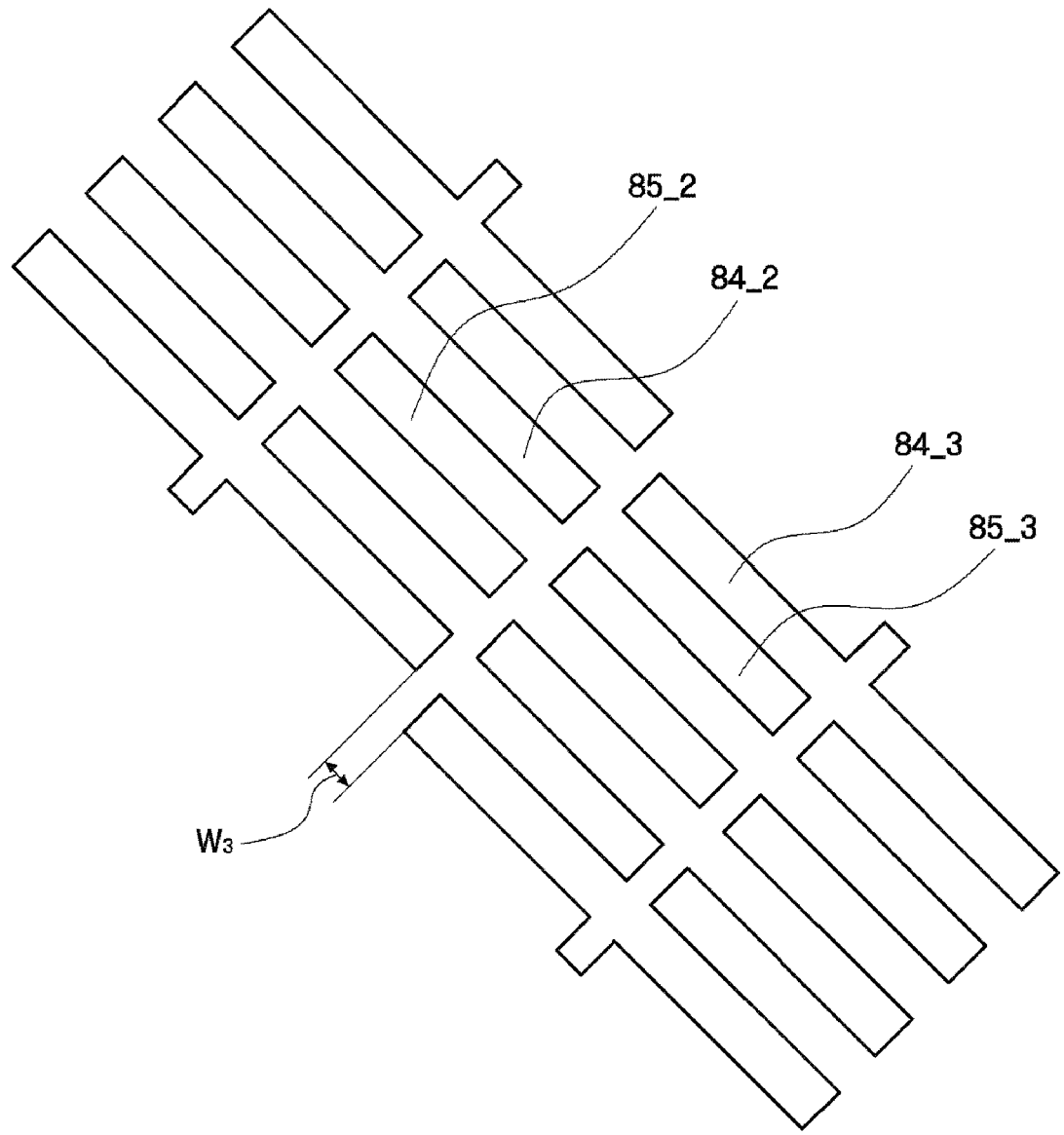
FIG. 9 is an enlarged view of portion D in FIG. 8.

A liquid crystal display according to a second exemplary embodiment of the invention is described in detail hereafter with reference to FIG. 8 and FIG. 9. FIG. 8 is a layout of a thin film transistor display panel included in a liquid crystal display according to a second exemplary embodiment of the invention. FIG. 9 is an enlarged view of portion D in FIG. 8.

Referring to FIG. 8 and FIG. 9, a pixel electrode 84 includes first connecting patterns 96_1 and second connecting patterns 96_2 arranged substantially parallel to each other in a first direction within the upper portion of the bisectional surface that transversely bisects the pixel electrode 84. The first connecting patterns 96_1 and second connecting patterns 96_2 may be alternately arranged repeatedly.

Similar to the liquid crystal display according to the first exemplary embodiment of the invention, the liquid crystal display of this exemplary embodiment may have an AOC structure including all of the pixel electrodes 84 and color filters (not shown) on the first insulating substrate 10. The configuration of the pixel electrode 84 and the alignment direction of the liquid crystals on the first insulating substrate 10, which are the main differences between this exemplary embodiment and the first exemplary embodiment of the invention, are described hereafter.

A plurality of microelectrodes 84_1 arranged substantially parallel to each other in a second direction is connected to the first connecting pattern 96_1, and a plurality of second microelectrodes 84_2 arranged substantially parallel to each other in the second direction is connected to the second connecting pattern 96_2. The first direction may be substantially perpendicular to the second direction. In detail, the first direction is angled at about 45° with respect to the polarization axis of the polarizer formed on the first insulating substrate 10. Liquid crystals (not shown) are aligned with the first connecting pattern 96_1 so that they are parallel to each other in the arrangement direction of the first microelectrodes 84_1 and face each other through the first connecting pattern 96_1. The second direction is angled at about 135° with respect to the polarization axis of the polarizer formed on the first insulating substrate 10. The liquid crystals, facing each other, are aligned with the second connecting pattern 96_2 so that they are parallel to each other in the arrangement direction of the second microelectrodes 84_2. That is, the alignment directions of the liquid crystals are opposite at the portion where the first microelectrodes 84_1 and the second microelectrodes 84_2 are adjacent. The widths $W_3$ of the first microelectrodes 84_1 and the second microelectrodes 84_2 may be about 3 to 5 μm and the first micro-slits 85_1 are disposed between adjacent first microelectrodes 84_1. The first microelectrodes 84_1 and the first micro-slits 85_1 may be alternately disposed. The second micro-slits 85_2 may be disposed between adjacent second microelectrodes 84_2, and the second microelectrodes 84_2 and the second micro-slits 85_2 may be alternately disposed. The widths of the first microelectrode 84_1 and the first micro-slit 85_1 may be substantially the same. Further, the widths of the second microelectrode 84_2 and the second micro-slits 85_2 may be substantially the same.

The first microelectrodes 84_1 are branched in two directions from the first connecting pattern 96_1 and the second microelectrodes 84_2 are separated in two directions from the second connecting pattern 96_2. The first microelectrodes 84_1 and the second microelectrodes 84_2 are alternately disposed. Specifically, the first microelectrodes 84_1 and the second microelectrodes 84_2 are alternately arranged. In detail, one end of the first microelectrode 84_1 may be arranged in a line with the second micro-slit 85_2 and one end of the second microelectrode 84_2 may be arranged in a line with the first micro-slit 85_1. The first microelectrode 84_1 faces and is spaced about 3 to 5 μm away from the second microelectrode 84_2. That is, the first microelectrode 84_1 is disposed about 3 to 5 μm away from the extension line of an end of the second micro-slit 85_2. Textures may be generated because the liquid crystals are aligned in opposite directions at the portion where the first and second microelectrodes 84_1 and 84_2 are adjacent. However, since the first microelectrodes 84_1 and second microelectrodes 84_2 are alternately disposed, textures may be reduced by reduction of abnormal motions of the liquid crystals when driving voltage is applied. Accordingly, the light transmittance of the liquid crystal display may be improved without blocking the portions with textures using other metals.

The pixel electrode 84 may further include third connecting patterns 96_3 and fourth connecting pattern 96_4 within the lower upper portion of the bisectional surface that transversely bisects the pixel electrode 84. That is, the pixel electrode 84 is respectively connected to the third and fourth connecting patterns 96_3, 96_4 arranged substantially parallel to each other in the second direction and the third and fourth connecting patterns 96_3, 96_4 arranged in the first direction, and may further include third micro-slits 85_3 and fourth micro-slits 85_4 arranged substantially parallel to each other. The third micro-slits 85_3 and the fourth micro-slits 85_4 are disposed between the third microelectrodes 84_3 and the fourth microelectrodes 84_4, respectively.

The upper and lower portions of the pixel electrode 84 may be symmetrical about the transverse bisectional line. For example, the third microelectrodes 84_3 and the fourth microelectrodes 84_4 may be alternately disposed and the distance between the third microelectrodes 84_3 and fourth microelectrodes 84_4 may be about 3 to 5 μm.

The liquid crystal layer (not shown) of this invention is formed by irradiating the liquid crystals, a UV-curable monomer, and a UV-curable initiator with UV light. Accordingly, the liquid crystals are pre-tilted toward the first connecting patterns 96_1, the second connecting patterns 96_2, the third connecting patterns 96_3, and the fourth connecting patterns 96_4.

Figure 10:
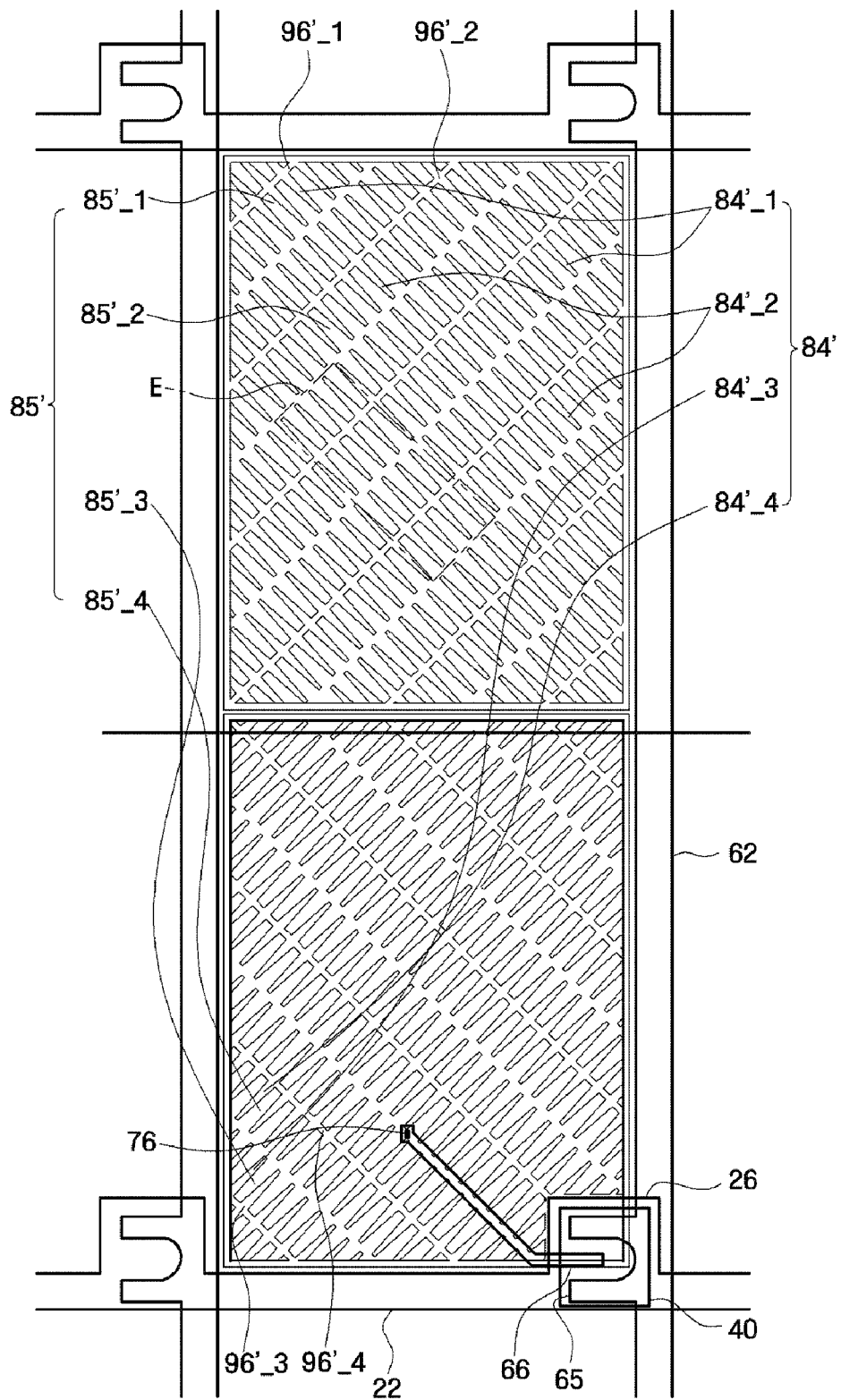
FIG. 10 is a layout of a thin film transistor display panel included in a liquid crystal display according to a modification of the second exemplary embodiment of the invention.
Figure 11:
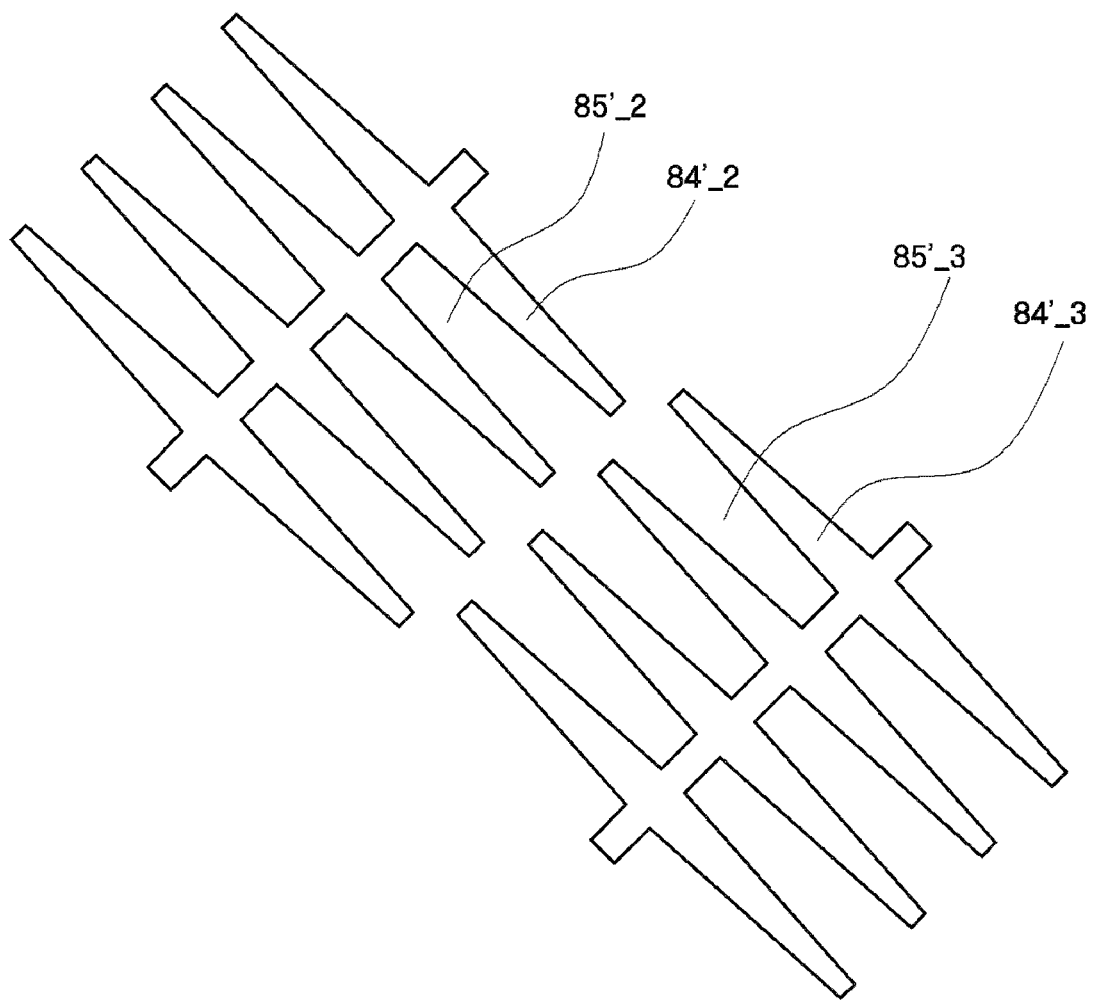
FIG. 11 is an enlarged view of portion E in FIG. 10.

A liquid crystal display according to a modification of the second exemplary embodiment of the invention is described hereafter with reference to FIG. 10 and FIG. 11. FIG. 10 is a layout of a thin film transistor display panel included in a liquid crystal display according to a modification of the second exemplary embodiment of the invention. FIG. 11 is an enlarged view of portion E in FIG. 10.

Referring to FIG. 10 and FIG. 11, according to a liquid crystal display of this exemplary embodiment, the widths of the first and second microelectrodes 84'_1, 84'_2 decrease in the direction away from first and second connecting patterns 96'_1, 96'_2.

The width of the first microelectrode 84'_1 is larger near the first connecting pattern 96'_1 than that of the second microelectrode 84'_2. Further, the width of the second microelectrode 84'_2 is larger near the second connecting pattern 96'_2 than that of the first microelectrode 84'_1. Similarly, the widths of the third and fourth microelectrodes 84'_3, 84'_4 are larger near the third and second connecting portions 96'_3, 96'_4 than those of the fourth and third microelectrodes 84'_4, 84'_3. The microelectrodes 84'_1, 84'_2, 84'_3, 84'_4 and the micro-slits 85'_1, 85'_2, 85'_3, 85'_4 are alternately disposed and the widths of the micro-slits 85'_1, 85'_2, 85'_3, 85'_4 increase when the widths of the microelectrodes 84'_1, 84'_2, 84'_3, 84'_4 decrease.

Accordingly, the liquid crystals may be easily aligned with the first, second, third, and fourth connecting patterns 96'_1, 96'_2, 96'_3, 96'_4 and the response speed may be improved. The widths of the first, second, third, and fourth microelectrodes 84'_1, 84'_2, 84'_3, 84'_4 decrease in the direction away from the first, second, third, and fourth connecting patterns 96'_1, 96'_2, 96'_3, 96'_4. Therefore, as described in relation to the modification of the first exemplary embodiment, the liquid crystals are aligned with the wider sides of the first, second, third, and fourth electrodes 84'_1, 84'_2, 84'_3, 84'_4.

Figure 12:
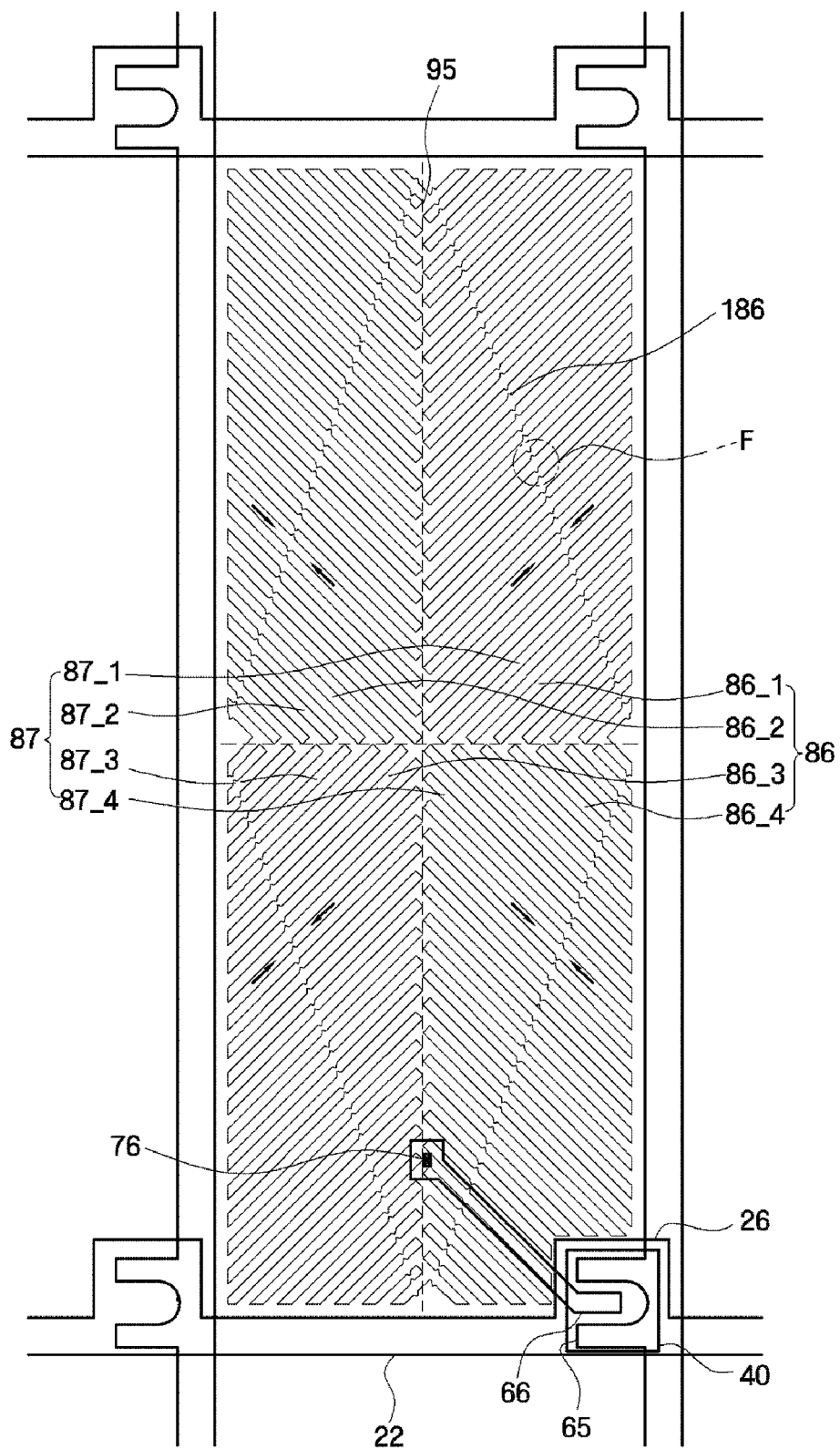
FIG. 12 is a layout of a thin film transistor display panel included in a liquid crystal display according to a third exemplary embodiment of the invention.
Figure 13:
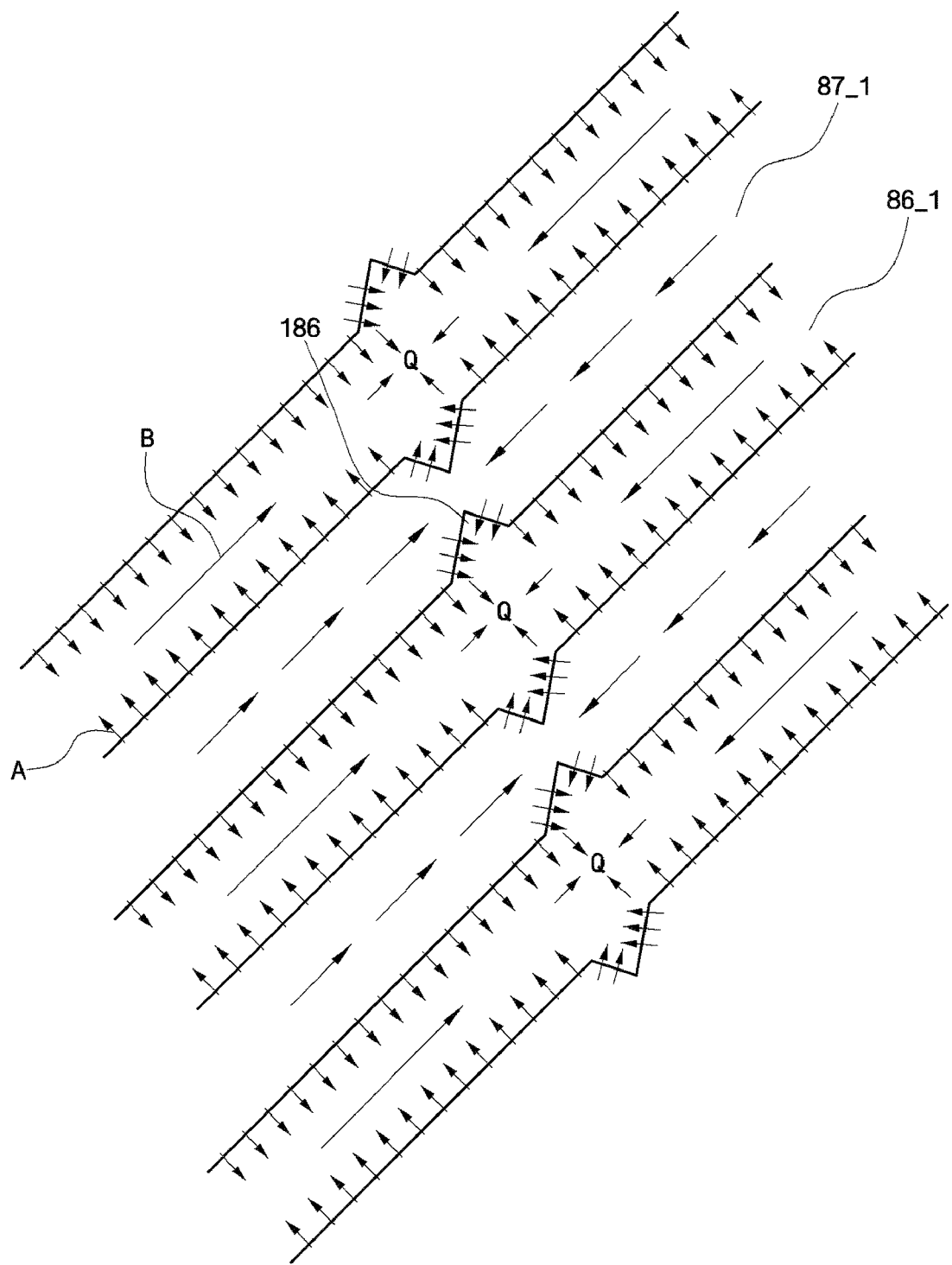
FIG. 13 is an enlarged view of portion F in FIG. 12.

A liquid crystal display according to the third exemplary embodiment of the invention is described hereafter with reference to FIG. 12 and FIG. 13. FIG. 12 is a layout of a thin film transistor display panel included in a liquid crystal display according to the third exemplary embodiment of the invention. FIG. 13 is an enlarged view of portion F in FIG. 12.

First, referring to FIG. 12, a thin film transistor display panel included in a liquid crystal display of this exemplary embodiment, includes pixel electrodes 86 that each include two or more groups of microelectrodes that are composed of a plurality of microelectrodes 86_1, 86_2, 86_3, 86_4 arranged substantially parallel to each other in a predetermined direction on a first insulating substrate 10. Each microelectrode 86_1, 86_2, 86_3, 86_4 has at least one notch 186.

A pixel electrode 86 of this exemplary embodiment may include, for example, four groups of microelectrodes. Each group of microelectrodes is composed of a plurality of microelectrodes 86_1, 86_2, 86_3, 86_4 arranged substantially parallel to each other in a predetermined direction and microslits 87_1, 87_2, 87_3, 87_4 are disposed between the microelectrodes 86_1, 86_2, 86_3, 86_4. The microelectrodes 86_1, 86_2, 86_3, 86_4 and the micro-slits 87_1, 87_2, 87_3, 87_4 are alternately arranged. The microelectrodes 86_1, 86_2, 86_3, 86_4 may have a bar shape in a predetermined direction within each microelectrode group. The widths of the microelectrodes 86_1, 86_2, 86_3, 86_4 and the micro-slits

87_1, 87_2, 87_3, 87_4 may be the same. The width of the microelectrodes 86_1, 86_2, 86_3, 86_4 may be about 3 to 5 μm in consideration of high light transmittance and the exposure sensitivity of an exposing apparatus forming the microelectrodes 86_1, 86_2, 86_3, 86_4. The widths of the microelectrodes 86_1, 86_2, 86_3, 86_4 of this exemplary embodiment may be constant from the center to the edges of the pixel electrode 86. The microelectrodes 86_1, 86_2, 86_3, 86_4 and the micro-slits 87_1, 87_2, 87_3, 87_4 are arranged parallel to each other in a predetermined direction within a microelectrode group and the arrangement directions of the microelectrodes 86_1, 86_2, 86_3, 86_4 are different for each microelectrode group.

At least one notch 186 is formed in each microelectrode 86_1, 86_2, 86_3, 86_4 and each microelectrode 86_1, 86_2, 86_3, 86_4 is sectioned into two or more domains by the notch 186.

For example, the first microelectrode group is disposed at the right-upper one in the quadrant for the pixel electrode 86 and includes a plurality of first microelectrodes 86_1 arranged parallel to each other in the first direction. The first direction may be angled at about 45° with respect to the polarization axis of the polarizer (not shown) formed on the first insulating substrate 10. The first micro-slits 87_1 are disposed between the first microelectrodes 86_1 arranged in the first direction. The common electrode (not shown) and an electric field, which are described below, are formed by the alternately disposed first microelectrodes 86_1 and the first micro-slits 87_1.

A notch 186 may have a convex shape protruding from at least one side of the first microelectrode 86_1 to the first micro-slit 87_1. The notches 186 protrude from both sides of the first microelectrodes and face other notches at the first micro-slits 87_1. Adjacent notches 186 are spaced such that they are not connected. The shape of the notch 186 may be polygonal, such as triangular, rectangular, diamond, or semicircular shape, but is not limited thereto as long as it can control the alignment of the liquid crystals (not shown) by forming singular points (see Q in FIG. 13).

Referring to the initial alignment of the liquid crystals (not shown) and the alignment of the liquid crystals after an electric field is applied to the common electrode (not shown) and the pixel electrodes 86 with reference to FIG. 13, the notches 186 intentionally form a singular point Q on the first microelectrode 86_1 where the directors of liquid crystals converge and the alignment direction A of the head of the liquid crystals is determined in advance by storing a large amount of the elastic energy of the liquid crystals disposed around the singular points Q. For example, a singular point Q of positive polarity, which the alignment direction A of the heads of the liquid crystals converge on, is defined around the convex notches 186. Because the alignment direction A of the liquid crystals disposed within the first microelectrode group is determined in advance by the notches 186, the liquid crystals are provided with a driving force in the B direction when a driving force is applied and the response speed of the liquid crystal display is improved by preventing random motions of the liquid crystals. The first microelectrode group is divided into two domains when one notch 186 is formed at the first microelectrode 86_1. In detail, because the liquid crystals disposed in the first microelectrode group are arranged toward the notch 186, the liquid crystals above the notch 186 and below the notch 186 in the first microelectrode group are arranged in different directions to converge. Accordingly, even though the first microelectrode 86_1 is long, the response speed of the liquid crystal display may be improved.

Referring to FIG. 12 and FIG. 13, the second microelectrode group is disposed at the left-upper quarter of the quadrant for the pixel electrode 86 and includes a plurality of second microelectrodes 86_2 arranged parallel to each other in the second direction. The second direction may be substantially perpendicular to the first direction and angled at about 135° with respect to the polarization axis of the polarizer (not shown) formed on the first insulating substrate 10. The second micro-slits 87_2 are disposed between the second microelectrodes 86_2.

The thin film transistor display panel may further include third and fourth microelectrode groups at the lower portion of the pixel electrode 86 of this exemplary embodiment.

The third microelectrode group, for example, may be at the left-lower one in the quadrant for the pixel electrode 86. The third microelectrode group includes a plurality of third microelectrodes 86_3 arranged parallel to each other in the third direction. The third direction may be substantially perpendicular to the second direction and angled at about 225° with respect to the polarization axis of the polarizer (not shown) formed on the first insulating substrate 10. The third micro-slits 87_3 are disposed between adjacent third microelectrodes 86_3.

The fourth microelectrode group, for example, may be at the right-lower quarter of the quadrant for the pixel electrode 86. The fourth microelectrode group includes a plurality of fourth microelectrodes 86_4 arranged parallel to each other in the fourth direction. The fourth direction may be substantially perpendicular to the third and first directions and angled at about 315° with respect to the polarization axis of the polarizer (not shown) formed on the first insulating substrate 10. The fourth micro-slits 87_4 are disposed between the fourth microelectrodes 86_4 arranged in the fourth direction within the fourth microelectrode group.

Similar to the first microelectrodes 86_1, notches 186 are formed in the second, third, and fourth microelectrodes 86_2, 86_3, 86_4 within the second, third, and fourth microelectrode groups and the liquid crystals are aligned toward the notches 186. Accordingly, each microelectrode group is divided into two domains for one notch 186. All of the liquid crystals in the pixel electrode 86 are aligned in the direction of the arrow shown in FIG. 12.

Adjacent microelectrode groups are connected through the connecting patterns 95. For example, the adjacent first and second microelectrode groups may be connected through the connecting pattern 95 that is formed by the extensions the first and second microelectrodes 86_1, 86_2. The connecting pattern 95 may a zigzag pattern formed by the alternately disposed extensions of the first microelectrodes 86_1 and the second microelectrodes 86_2. However, the connecting pattern 95 of this exemplary embodiment is not limited to the above and may be a cross that divides the pixel region into quarters. Therefore, the microelectrodes 86_1, 86_2, 86_3, 86_4 are arranged in different directions from the cross connecting pattern.

A liquid crystal layer (not shown) including liquid crystals, a UV-curable monomer, and a UV-curable initiator is interposed between the opposite thin film transistor display panel and the common electrode display panel (now shown).

The liquid crystals contained in the liquid crystal layer are pre-tilted toward the notches 186, for example, at about 80° to 90° with respect to the thin film transistor display panel by irradiating with UV light.

Figure 14:
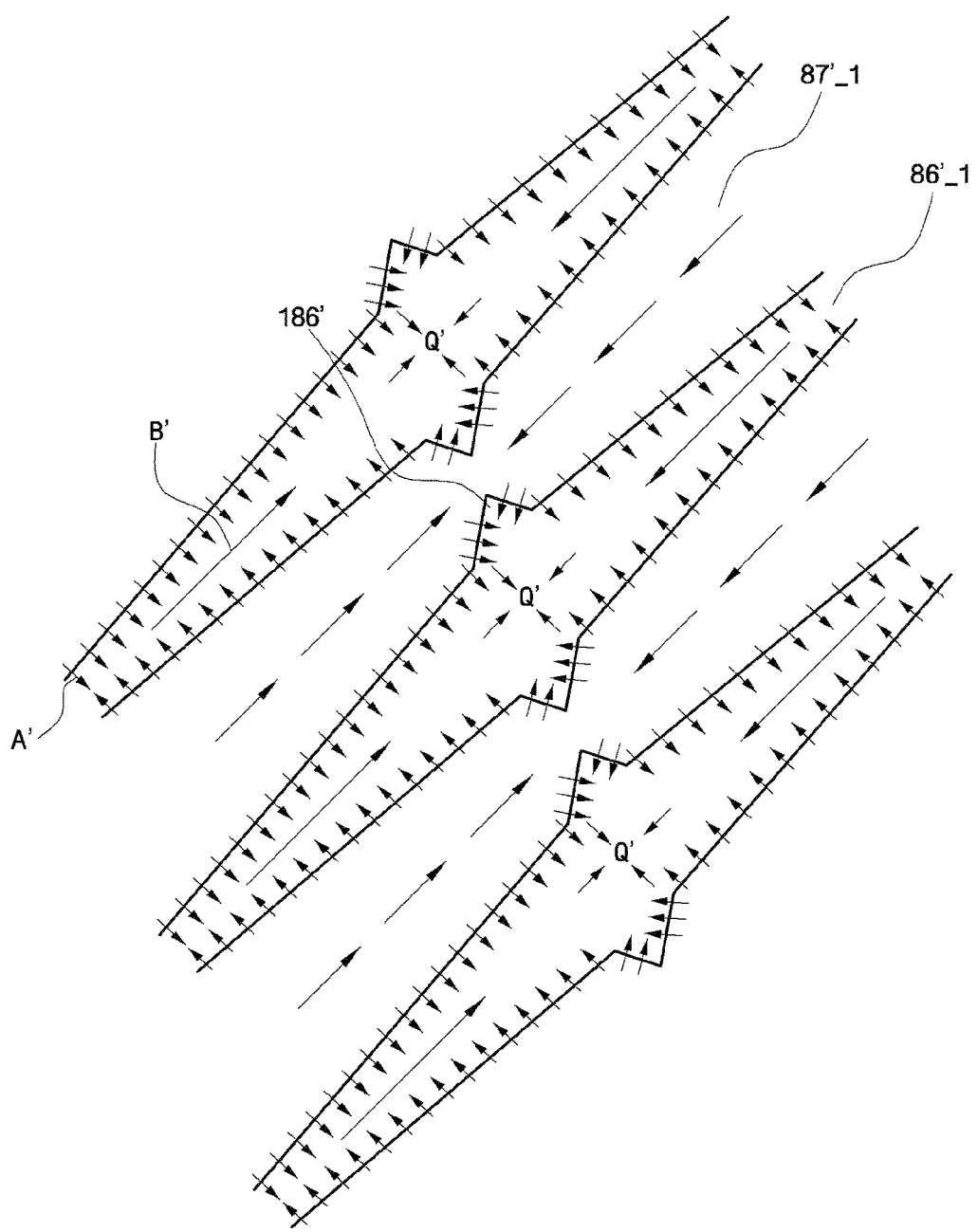
FIG. 14 is an enlarged plan view of a thin film transistor display panel included in a liquid crystal display according to a modification of the third exemplary embodiment of the invention.

A liquid crystal display according to a modification of the third exemplary embodiment of the invention is described in detail hereafter with reference to FIG. 14. FIG. 14 is an enlarged plan view of a thin film transistor display panel included in a liquid crystal display according to a modification of the third exemplary embodiment of the invention. For the following exemplary embodiments and modifications, the same reference numerals are given to the components that are the same as those of the third exemplary embodiment of the invention and these components are not described.

Referring to FIG. 14, in the liquid crystal display of the modification, the first microelectrode 86'_1 decreases in width in the direction away from a notch 186'. Further, the first micro-slit 87'_1 increases in width in the direction away from the notch 186'. Accordingly, the alignment of the liquid crystals (not shown) may be effectively controlled. In detail, since the first microelectrode 86'_1 increases in width as it approaches the notch 186', the alignment direction A' of the head of liquid crystals (not shown) is directed at a singular point Q' of positive polarity. That is, the driving force (in B' direction) that directs the heads of liquid crystals to the singular point Q' increases as compared to where the width of the first microelectrode 86'_1 is uniform. Therefore, the liquid crystals disposed within the first microelectrode 86'_1 may be aligned in a predetermined direction in a shorter time.

This also appears in the second, third, and fourth microelectrode groups including the second, third, and fourth microelectrodes (not shown) and the liquid crystals are aligned such that they converge on the notch 186' within each microelectrode group.

Figure 15:
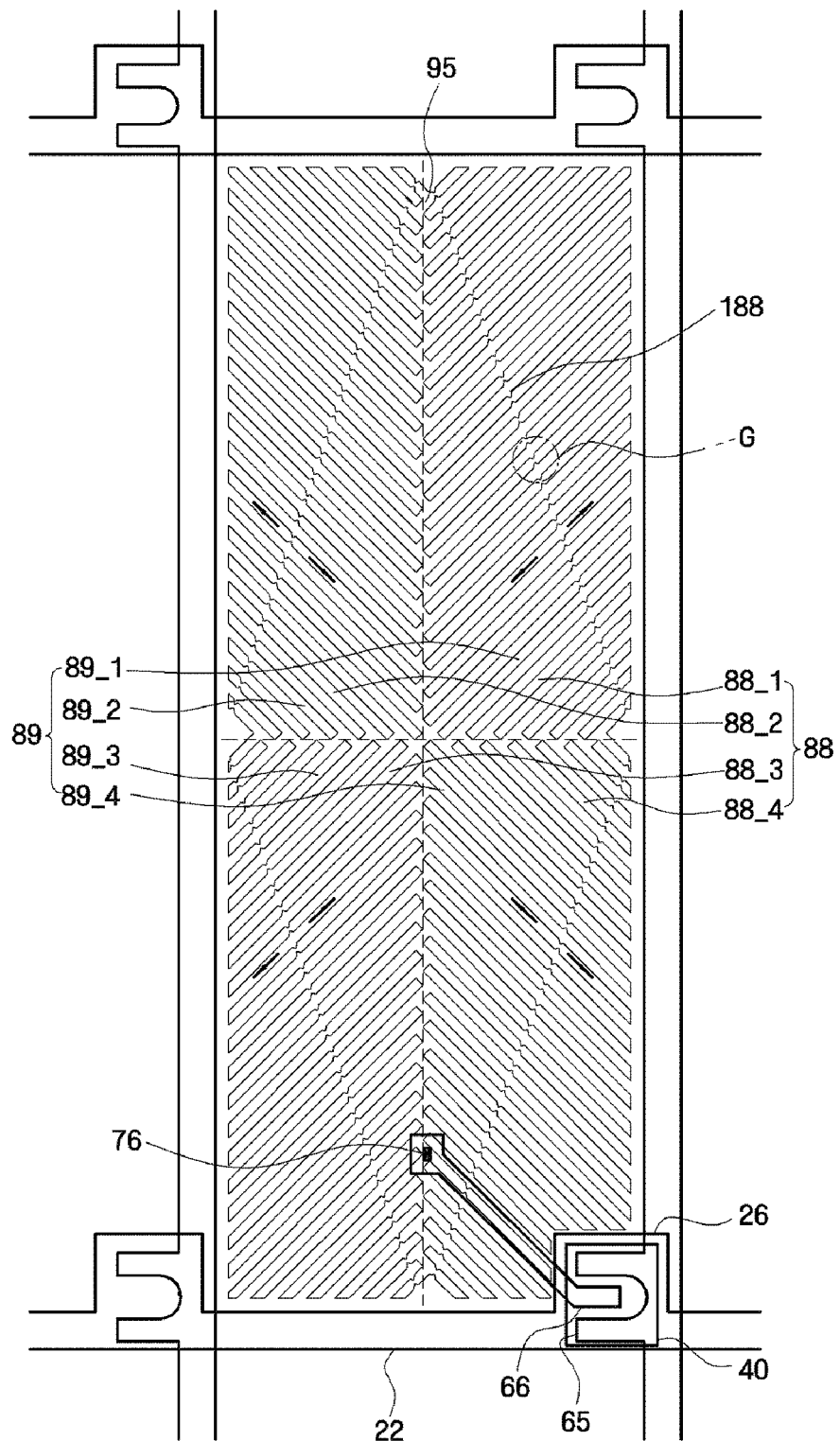
FIG. 15 is layout of a thin film transistor display panel included in a liquid crystal display according to a fourth exemplary embodiment of the invention.
Figure 16:
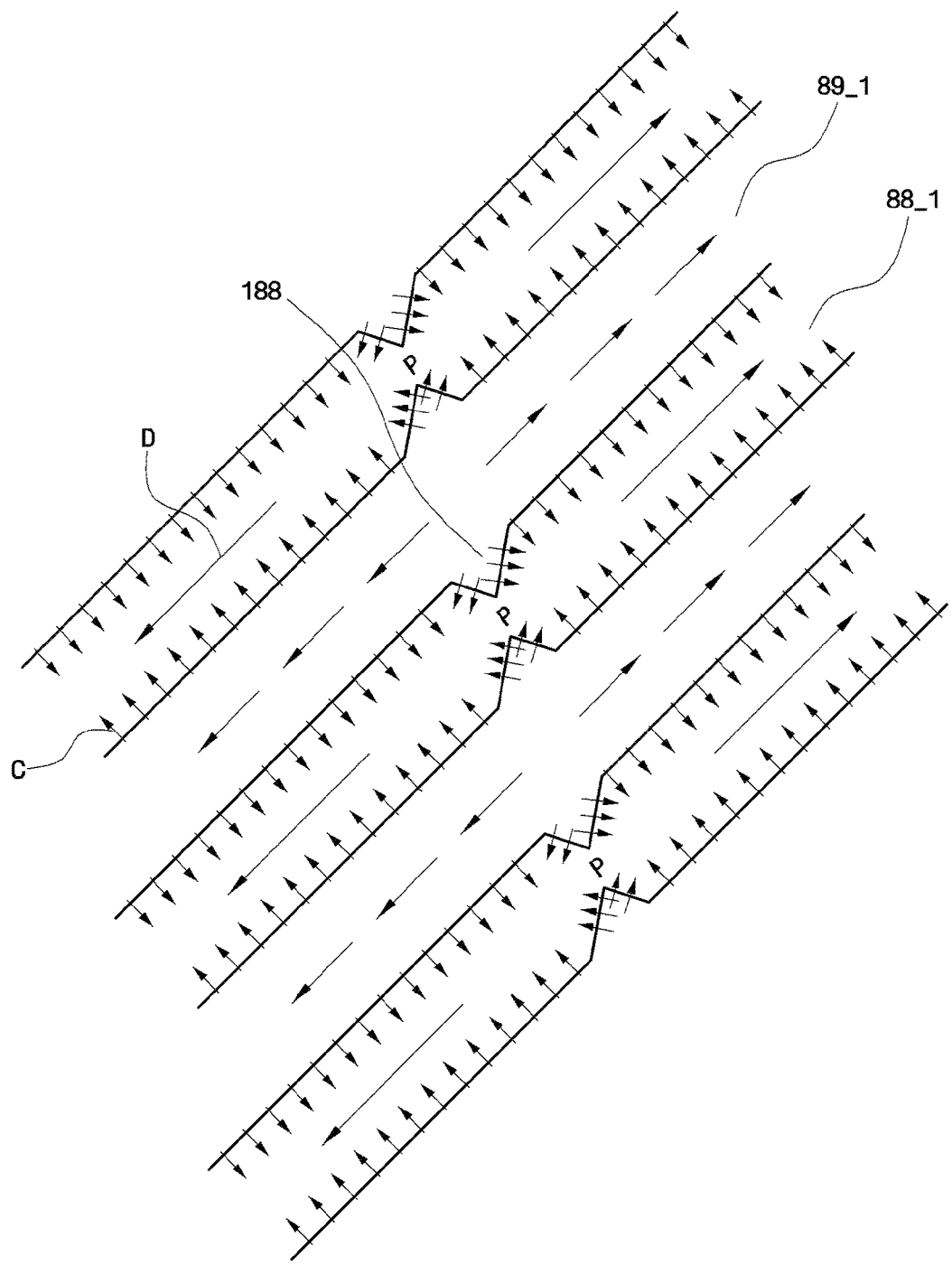
FIG. 16 is an enlarged view of portion G in FIG. 15.

A liquid crystal display according to a fourth exemplary embodiment of the invention is described in detail hereafter with reference to FIG. 15 and FIG. 16. FIG. 15 is layout of a thin film transistor display panel included in a liquid crystal display according to a fourth exemplary embodiment of the invention. FIG. 16 is an enlarged view of portion G in FIG. 15.

Referring to FIG. 15 and FIG. 16, a pixel electrode 88 in a liquid crystal display of this exemplary embodiment, may be equally divided into first, second, third, and fourth microelectrode groups. The first, second, third, and fourth microelectrode groups respectively include first, second, third, and fourth microelectrodes 88_1, 88_2, 88_3, 88_4 that are respectively angled at about 45°, 135°, 225°, 315° with respect to the polarization axis of the polarizer (not shown) formed on the first insulating substrate (not shown). The first, second, third, and fourth microelectrodes 88_1, 88_2, 88_3, 88_4 are alternately disposed with the first, second, third, and fourth micro-slits 89_1, 89_2, 89_3, 89_4.

A notch 188 of this exemplary embodiment may be a recess that is recessed toward the center of the first, second, third, and fourth microelectrodes 88_1, 88_2, 88_3, 88_4 from at least one side of the first, second, third, and fourth microelectrodes 88_1, 88_2, 88_3, 88_4. The notch may be a recess that is recessed toward the center of the first, second, third, and fourth microelectrodes 88_1, 88_2, 88_3, 88_4 from both sides of the first, second, third, and fourth microelectrodes 88_1, 88_2, 88_3, 88_4. Notches 188 facing each other through the center of the first, second, third, and fourth microelectrodes 88_1, 88_2, 88_3, 88_4 may be spaced such that they are not connected.

Referring to the initial alignment of the liquid crystals (not shown) and the alignment after an electric field is applied to the pixel electrode 88 and the common electrode (not shown) with reference to FIG. 16, because of the notch 188, a singular point P of negative polarity, at which a part of alignment direction C of the head of liquid crystals is divergent and the other part is convergent, is formed on the first microelectrode 88_1. Because the alignment direction C of the liquid crystals disposed within the first microelectrode group is determined in advance by the notch 188, the liquid crystals are provided with a D-directional driving force when a driving voltage is applied and the response speed of the liquid crystal display may be improved because random motions of the liquid crystals may be prevented. The first microelectrode group is divided into two domains when one notch 188 is formed at the first microelectrode 88_1. In detail, because the liquid crystals in the first microelectrode group are aligned opposite the notch 188, the liquid crystals above and below the notch 188 in the first microelectrode group are aligned in different directions such that they diverge. Accordingly, even though the first microelectrode 88_1 is long, the determination speed of the alignment of the liquid crystals increases when the driving voltage is applied and the response speed of the liquid crystal display may be improved.

Referring to FIG. 15, similar to the first microelectrode group, other microelectrode groups are provided with a notch 188. Each microelectrode group is divided into a plurality of domains and the alignment direction of the corresponding liquid crystals are divergent from the notch 188 as indicated by arrows when a driving force is applied.

Further, the microelectrodes 88_1, 88_2, 88_3, 88_4 may each include two or more notches 188. According to this configuration, the recessed notch 188 of this exemplary embodiment and the convex notch of the first exemplary embodiment of the invention (186 of FIG. 12) may be alternately disposed in each of the microelectrodes 88_1, 88_2, 88_3, 88_4. Each microelectrode group is divided into a plurality of domains by the recessed notch 188 and the convex notch. The alignment direction C of the heads of the liquid crystals may be determined in advance such that the heads of the liquid crystals disposed at the interface of the domains are directed to a singular point of positive polarity from the singular point P of negative polarity by alternately arranging recessed notches 188 and convex notches. Accordingly, the alignment speed of the liquid crystals may increase and the response speed of the liquid crystal display may be improved.

Figure 17:
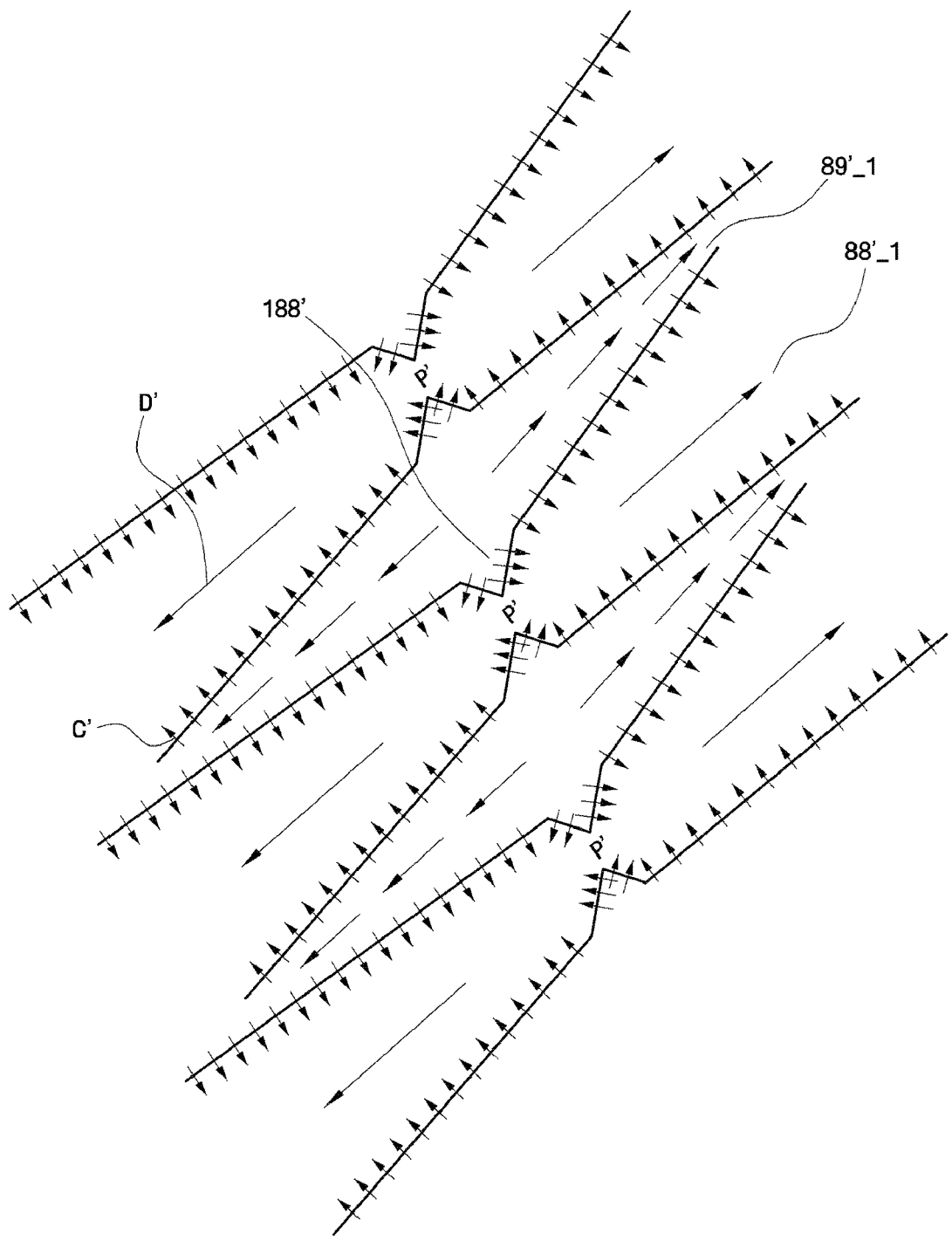
FIG. 17 is an enlarged plan view of a thin film transistor display panel included in a liquid crystal display according to a modification of the fourth exemplary embodiment of the invention.

A liquid crystal display according to a modification of the fourth exemplary embodiment of the invention is described in detail hereafter with reference to FIG. 17. FIG. 17 is an enlarged plan view of a thin film transistor display panel included in a liquid crystal display according to a modification of the fourth exemplary embodiment of the invention.

Referring to FIG. 17, in a liquid crystal display according to this modification, the width of a first microelectrode 88'_1 increases in the direction away from notches 188'. Further, the width of a first micro-slit 89'_1 decreases in the direction away from the notches 188'. Therefore, the alignment direction C' of the heads of the liquid crystals is directed opposite to a singular point P' of negative polarity. That is, the driving force (D' direction) for alignment, which directs the head alignment direction to the opposite of the singular point P', increases as compared to where the width of the first microelectrode 88'_1 is uniform. Accordingly, the liquid crystals disposed within the first microelectrode 88'_1 may be aligned in a predetermined direction in a shorter time.

This also appears in the second, third, and fourth microelectrode groups including the second, third, and fourth microelectrodes (not shown) and the liquid crystals are aligned to diverge from the notch 188' in each microelectrode group when a driving voltage is applied.

As described above, according to a liquid crystal display of exemplary embodiments and modifications of the invention, one or more effects as follows may be achieved.

First, it may be possible to reduce textures and improve light transmittance by reducing the width of the pixel electrode in the area where domains cross.

Second, it may be possible to reduce textures by alternately disposing microelectrodes.

Third, it may be possible to improve the response speed of liquid crystals by controlling the widths of microelectrodes.

Fourth, it may be possible to improve the response speed by including notches.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate;
   a pixel electrode disposed on the first substrate and comprising a plurality of domains;
   a second substrate facing the first substrate;
   a common electrode disposed on the second substrate without being patterned; and
   a liquid crystal layer interposed between the first substrate and the second substrate,
   wherein the pixel electrode further comprises a plurality of microelectrodes arranged substantially parallel to each other in each domain and a connecting pattern that connects the microelectrodes, the connecting pattern comprising a zigzag pattern.

2. The liquid crystal display of claim 1, wherein the connecting pattern comprises extensions of microelectrodes in adjacent domains.

3. The liquid crystal display of claim 2, wherein the connecting pattern has substantially the same width as the microelectrodes.

4. The liquid crystal display of claim 1, wherein the microelectrodes comprise first microelectrodes arranged in a first direction within a first domain and second microelectrodes arranged in a second direction within a second domain that is adjacent to the first domain, and the connecting pattern comprises extensions of the first microelectrodes and extensions of the second microelectrodes that are alternately disposed.

5. The liquid crystal display of claim 4, wherein the first direction is substantially perpendicular to the second direction.

6. The liquid crystal display of claim 1, wherein the width of the microelectrodes is substantially the same as the width of micro-slits that are alternately disposed with the microelectrodes.

7. The liquid crystal display of claim 6, wherein the width of each microelectrode ranges from 3 to 5 μm.

8. The liquid crystal display of claim 1, wherein the width of the microelectrodes decreases in a direction away from the connecting pattern.

9. The liquid crystal display of claim 1, wherein the pixel electrode is divided into four domains.

10. The liquid crystal display of claim 9, further comprising:
    a pair of polarizers respectively disposed on the first substrate and the second substrate,
    wherein the polarization axes of the polarizers are perpendicular to each other, and the microelectrodes of the four domains are respectively angled at about 45°, 135°, 225°, and 315° with respect to the polarization axis of the polarizer disposed on the first substrate.

11. The liquid crystal display of claim 1, wherein the liquid crystal layer comprises liquid crystals, a UV-curable monomer, and a UV-curable initiator, and the liquid crystals are pre-tilted toward the connecting pattern.

12. The liquid crystal display of claim 1, further comprising:
    color filters interposed between the first substrate and the pixel electrode.

13. A liquid crystal display, comprising:
    a first substrate;
    a pixel electrode disposed on the first substrate and comprising:
        a first connecting pattern and a second connecting pattern arranged substantially parallel to each other in a first direction; and
        a plurality of first microelectrodes and second microelectrodes connected to the first connecting pattern and the second connecting pattern, respectively,
        wherein the first microelectrodes and the second microelectrodes are arranged substantially parallel to each other in a second direction and alternately disposed;
    a second substrate facing the first substrate;
    a common electrode disposed on the second substrate without being patterned; and
    a liquid crystal layer interposed between the first substrate and the second substrate.

14. The liquid crystal display of claim 13, wherein the distance between the first microelectrodes and the second microelectrodes ranges from 3 to 5 μm.

15. The liquid crystal display of claim 13, wherein the first direction is substantially perpendicular to the second direction.

16. The liquid crystal display of claim 13, wherein the pixel electrode further comprises:
    a third connecting pattern and a fourth connecting pattern substantially parallel to each other in the second direction, and
    third microelectrodes and fourth microelectrodes connected to the third connecting pattern and the fourth connecting pattern, respectively,
    wherein the third microelectrodes and the fourth microelectrodes are arranged substantially parallel to each other in the first direction and alternately disposed.

17. The liquid crystal display of claim 13, further comprising:
    a pair of polarizers respectively disposed on the first substrate and the second substrate,
    wherein the polarization axes of the polarizers are perpendicular to each other, the first direction is angled at about 45° with respect to the polarization axis of the polarizer disposed on the first substrate, and the second direction is angled at about 135° with respect to the polarization axis of the polarizer disposed on the first substrate.

18. The liquid crystal display of claim 13, wherein the widths of the first microelectrodes and the second microelectrodes are substantially the same as the widths of first micro-slits and second micro-slits that are alternately disposed with the first microelectrodes and the second microelectrodes, respectively.

19. The liquid crystal display of claim 18, wherein the width of the first microelectrodes and the second microelectrodes range from 3 to 5 μm.

20. The liquid crystal display of claim 13, wherein the widths of the first microelectrodes and the second microelectrodes decrease in a direction away from the first connecting pattern and the second connecting pattern, respectively.

21. The liquid crystal display of claim 13, wherein the liquid crystal layer comprises liquid crystals, a UV-curable monomer, and a UV-curable initiator, and the liquid crystals are pre-tilted toward the connecting patterns.

22. The liquid crystal display of claim 13, further comprising:
  color filters interposed between the first substrate and the pixel electrodes.

23. A liquid crystal display, comprising:
  a first substrate;
  a pixel electrode disposed on the first substrate and comprising a plurality of domains;
  a second substrate facing the first substrate;
  a common electrode disposed on the second substrate without being patterned; and
  a liquid crystal layer interposed between the first substrate and the second substrate,
  wherein the pixel electrode further comprises a plurality of microelectrodes arranged substantially parallel to each other in each domain and a connecting pattern that connects the microelectrodes, the connecting pattern comprising a zigzag pattern, each microelectrode comprising a notch, and each microelectrode group is divided into two or more domains by the notch.

24. The liquid crystal display of claim 23, further comprising:
  micro-slits disposed between the microelectrodes,
  wherein the microelectrodes and the micro-slits are alternately disposed, and the notch comprises a convex shape protruding to the micro-slit from at least one side of the microelectrode or a concave shape recessed toward the center of the microelectrode from at least one side of the microelectrode.

25. The liquid crystal display of claim 24, wherein the convex or concave shape comprises a triangular shape.

26. The liquid crystal display of claim 24, wherein the notch has a convex shape protruding at both sides of the microelectrode, and the notches face each other at the micro-slit.

27. The liquid crystal display of claim 26, wherein the width of the microelectrode decreases in a direction away from notch.

28. The liquid crystal display of claim 24, wherein the notch has a concave shape recessed toward the center at both sides of the microelectrode, and the notches face each other in the microelectrode.

29. The liquid crystal display of claim 28, wherein the width of the microelectrode increases in a direction away from the notch.

30. The liquid crystal display of claim 24, wherein each microelectrode comprises two or more notches, and convex notches and concave notches are alternately disposed in the microelectrode.

* * * * *